(12) United States Patent
Yoshihara et al.

(10) Patent No.: US 10,253,178 B2
(45) Date of Patent: Apr. 9, 2019

(54) FLOWABILITY IMPROVER FOR POLYCARBONATE AND POLYARYLATE, POLYCARBONATE RESIN COMPOSITION, POLYARYLATE RESIN COMPOSITION, AND MOLDED ARTICLE THEREOF

(71) Applicant: KANEKA CORPORATION, Osaka-shi (JP)

(72) Inventors: Shusuke Yoshihara, Settsu (JP); Hidekazu Kawakubo, Settsu (JP); Keika Hattori, Settsu (JP); Kazuaki Matsumoto, Settsu (JP); Kazunori Saegusa, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/477,483

(22) Filed: Apr. 3, 2017

(65) Prior Publication Data

US 2017/0204262 A1 Jul. 20, 2017

Related U.S. Application Data

(63) Continuation of application No. PCT/JP2015/078210, filed on Oct. 5, 2015.

(30) Foreign Application Priority Data

Oct. 3, 2014 (JP) ................................ 2014-205199

(51) Int. Cl.
| C08L 67/03 | (2006.01) |
| C08G 63/193 | (2006.01) |
| C08K 5/13 | (2006.01) |
| C08K 5/524 | (2006.01) |
| C08L 69/00 | (2006.01) |
| C08L 67/02 | (2006.01) |

(52) U.S. Cl.
CPC ............ *C08L 67/03* (2013.01); *C08G 63/193* (2013.01); *C08K 5/13* (2013.01); *C08K 5/524* (2013.01); *C08L 67/02* (2013.01); *C08L 69/00* (2013.01)

(58) Field of Classification Search
CPC .......... C08L 67/02; C08L 67/03; C08L 69/00; C08K 5/13; C08G 63/193
See application file for complete search history.

(56) References Cited

U.S. PATENT DOCUMENTS

| 4,126,602 A * | 11/1978 | Salee ................... C08G 63/195 524/513 |
| 4,278,785 A * | 7/1981 | Rosenfeld .............. C08G 63/20 528/126 |
| 4,452,933 A * | 6/1984 | McCready ................ C08K 5/04 524/217 |
| 4,543,313 A | 9/1985 | Mahabadi et al. |
| 5,005,028 A | 4/1991 | Tamura et al. |
| 5,015,552 A | 5/1991 | Tamura et al. |
| 5,187,242 A | 2/1993 | Sakashita et al. |
| 5,254,610 A * | 10/1993 | Small, Jr. ................ C08K 5/524 524/120 |
| 2008/0050664 A1 | 2/2008 | Ogaki et al. |
| 2009/0239983 A1 | 9/2009 | Nodera et al. |
| 2009/0286921 A1 * | 11/2009 | Vaze ........................ C08L 69/00 524/537 |
| 2009/0324282 A1 | 12/2009 | Ogaki et al. |
| 2012/0172570 A1 * | 7/2012 | Tabata .................... C08G 63/19 528/176 |
| 2012/0175549 A1 | 7/2012 | Yoshihara et al. |
| 2015/0025188 A1 | 1/2015 | Yoshihara et al. |

FOREIGN PATENT DOCUMENTS

| CN | 102317374 A | 1/2012 | |
| DE | 19820123 A1 * | 11/1999 | ........... C08K 5/5442 |
| EP | 0 434 998 A2 | 7/1991 | |
| JP | 60-104155 A | 6/1985 | |
| JP | 61-69861 | 4/1986 | |
| JP | 61-149901 A | 7/1986 | |
| JP | 62-174195 A | 7/1987 | |
| JP | 62-297319 A | 12/1987 | |
| JP | 1-271456 A | 10/1989 | |
| JP | 3-203956 A | 9/1991 | |
| JP | 4-275360 A | 9/1992 | |
| JP | 7-310001 A | 11/1995 | |
| JP | 7-310002 A | 11/1995 | |
| JP | 7-310003 A | 11/1995 | |
| JP | 2002-249656 A | 9/2002 | |
| JP | 2003-26911 A | 1/2003 | |

(Continued)

OTHER PUBLICATIONS

International Search Report dated Dec. 22, 2015 in PCT/JP2015/078210 (English language translation only).
International Preliminary Report on Patentability and Written Opinion dated Apr. 13, 2017 in PCT/JP2015/078210 (English language translation only).

(Continued)

*Primary Examiner* — Robert S Jones
(74) *Attorney, Agent, or Firm* — Oblon, McClelland, Maier & Neustadt, L.L.P.

(57) ABSTRACT

A method of improving flowability of polycarbonate or polyarylate includes mixing the polycarbonate or the polyarylate with a flowability improver including a polyester. The polyester is a polycondensate of monomers including a bisphenol component (B) and a dicarboxylic acid component (C) at a molar ratio satisfying (B):(C)=45:55-55:45. The polyester includes a portion derived from the bisphenol component (B) and the dicarboxylic acid component (C) in an amount of 50 mol % or more.

19 Claims, No Drawings

(56) References Cited

FOREIGN PATENT DOCUMENTS

| JP | 2006-106719 A | 4/2006 |
|----|---------------|--------|
| JP | 2007-262290 A | 10/2007 |
| JP | 2010-83930 A | 4/2010 |
| JP | 2011-26593 A | 2/2011 |
| JP | 2013-213153 A | 10/2013 |
| WO | WO 2011/033815 A1 | 3/2011 |
| WO | WO 2012/068075 A2 | 5/2012 |

OTHER PUBLICATIONS

Hong-Bing Tsai, et al., "Thermotropic copolyesters modified with nonmesogenic rigid groups", Polymer Bulletin, vol. 24, 1990, pp. 293-297.
Extended European Search Report dated May 18, 2018, in European Patent Application No. 15847031.0.

* cited by examiner

FLOWABILITY IMPROVER FOR POLYCARBONATE AND POLYARYLATE, POLYCARBONATE RESIN COMPOSITION, POLYARYLATE RESIN COMPOSITION, AND MOLDED ARTICLE THEREOF

CROSS-REFERENCE TO RELATED APPLICATIONS

The present application is a continuation of International Application No. PCT/JP2015/078210, filed Oct. 5, 2015, which is based upon and claims the benefits of priority to Japanese Application No. 2014-205199, filed Oct. 3, 2014. The entire contents of these applications are incorporated herein by reference.

BACKGROUND OF THE INVENTION

Field of the Invention

The present invention relates to a flowability improver for improving flowability during a molding process without ruining inherent properties (transparency, impact resistance, high rigidity, mechanical strength, surface layer peeling resistance, heat resistance, chemical resistance, and the like) of a polycarbonate resin and a polyarylate resin, high-flowability polycarbonate resin composition and polyarylate resin composition that contain the flowability improver, and a molded article thereof.

Discussion of the Background

The polycarbonate resin and the polyarylate resin have excellent mechanical and thermal properties and thus are widely used industrially in fields of OA (office automation) equipment, information and communication equipment, electronic and electrical equipment, household appliances, automobile parts, building materials, and the like. However, these resins have high melt viscosity, and thus are poor in flowability and moldability.

In recent years, along with progresses in increase in size, decrease in thickness, complication in shape and sophistication of molded articles of these resin compositions and a growing interest in environmental problems, there has been a demand for a technology for improving the melt flowability and the moldability of these resin compositions without ruining excellent characteristics of molded articles formed from the polycarbonate resin and the polyarylate resin.

For example, as a method for improving melt flowability of an aromatic polycarbonate-based resin composition, a method in which a molecular weight of the aromatic polycarbonate-based resin itself is reduced is well known (Patent Document 1). However, for a polycarbonate resin of a low molecular weight, due to the low molecular weight, a temperature range of changing from ductile fracture to brittle fracture increases and thus there are problems such as that impact resistance strength is significantly reduced even at room temperature and that hydrolysis resistance also decreases.

Patent Document 2 describes that flowability is improved by adding a pentaerythritol-based ester compound and lowering the molecular weight of a polycarbonate resin by transesterification. This method allows the flowability to be improved without significantly ruining various characteristics. However, sufficient impact strength is not maintained, and there is also a concern about yellowing due to transesterification. Further, aliphatic esters of phthalic acid such as dioctyl phthalate and dibutyl phthalate commonly used in other resins as plasticizers, or phosphate esters such as tricresyl phosphate and diphenyl cresyl phosphate, and the like lack affinity with aromatic polycarbonate resins and cause mechanical and thermal properties to be remarkably degraded.

As a method for improving flowability without ruining these characteristics, Patent Document 3 describes that a specific bisphenol-based compound is added. However, in this method, since a low molecular weight compound is added, there is a concern that the additive may bleed out during molding.

Examples of a polymer flowability improver include a method of blending a copolymer obtained by polymerizing several kinds of (meth) acrylic acid ester monomers and aromatic alkenyl compounds in a polycarbonate resin (Patent Documents 4 and 5) and a method of blending a liquid crystalline resin (Patent Document 6). However, in these methods, although melt flowability during a molding process is improved, compatibility between the polycarbonate resin and the blends is poor and thus there is a problem that transparency of an obtained molded article cannot be maintained.

Patent Document 7 describes that transparency and mechanical strength are maintained by using a copolyester carbonate resin as a flowability improver of a polycarbonate-based resin. However, in order to improve the flowability, a blending amount of 20 parts by weight or more of the copolyester carbonate resin is necessary when the entire resin composition combining the polycarbonate-based resin and the copolyester carbonate resin is 100 parts by weight. Further improvement in functional expression efficiency is demanded.

Patent Document 8 describes that, by adding a liquid crystalline thermoplastic resin, in which mesogen groups and spacers are alternately polycondensed, to another general-purpose resin, thermal conductivity of the general-purpose resin can be improved. However, in Patent Document 8, there is no description regarding whether or not flowability during a molding process can be improved without ruining transparency and mechanical properties of a polycarbonate resin or a polyarylate resin when the liquid crystalline thermoplastic resin is added to the resins.

Patent Document 9 describes liquid crystalline resin particles formed from biphenol or bisphenol A and an aliphatic dicarboxylic acid as a component of a toner composition, and describes that the liquid crystalline resin having a melt viscosity is suitable for the toner composition. However, in Patent Document 9, there is no description regarding whether or not the liquid crystalline resin can improve flowability during a molding process without ruining transparency and mechanical properties of a polycarbonate resin or a polyarylate resin.

Patent Document 1: Japanese Patent Laid-Open Publication No. Sho 62-297319 (published on Dec. 24, 1987).
Patent Document 2: International Publication No. 2012/068075 (published on May 24, 2012).
Patent Document 3: Japanese Patent Laid-Open Publication No. Hei 1-271456 (published on Oct. 30, 1989).
Patent Document 4: Japanese Patent Laid-Open Publication No. 2013-213153 (published on Oct. 17, 2013).
Patent Document 5: Japanese Patent Laid-Open Publication No. 2011-26593 (published on Feb. 10, 2011).
Patent Document 6: Japanese Patent Laid-Open Publication No. 2002-249656 (published on Sep. 6, 2002).
Patent Document 7: Japanese Patent Laid-Open Publication No. Hei 4-275360 (published on Sep. 30, 1992).
Patent Document 8: International Publication No. 2011/033815 (published on Mar. 24, 2011).

Patent Document 9: Japanese Patent Laid-Open Publication No. Sho 61-69861 (published on Apr. 10, 1986).

SUMMARY OF THE INVENTION

According to an aspect of the present invention, a method of improving flowability of polycarbonate or polyarylate includes mixing the polycarbonate or the polyarylate with a flowability improver including a polyester. The polyester is a polycondensate of monomers including a bisphenol component (B) and a dicarboxylic acid component (C) at a molar ratio satisfying (B):(C)=45:55-55:45. The polyester includes a portion derived from the bisphenol component (B) and the dicarboxylic acid component (C) in an amount of 50 mol % or more. The bisphenol component (B) has formula (2)

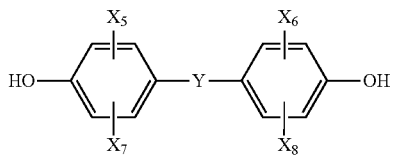
(2)

where $X_5$-$X_8$ may be the same or different and each represent a hydrogen atom, a halogen atom, or an alkyl group with 1-4 carbons, and Y represents a methylene group, an isopropylidene group, a cyclic alkylidene group, an aryl-substituted alkylidene group, an arylenedialkylidene group, —S—, —O—, a carbonyl group or —SO$_2$—. The dicarboxylic acid component (C) has formula (3)

HOOC—$R_1$—COOH (3)

where $R_1$ represents a divalent straight-chain substituent that has 2-18 main-chain atoms and may include a branch.

According to another aspect of the present invention, a method of improving flowability of polycarbonate or polyarylate includes mixing the polycarbonate or the polyarylate with a flowability improver including a polyester. The polyester is a polycondensate of monomers including a biphenol component (A), a bisphenol component (B), and a dicarboxylic acid component (C) at a molar ratio satisfying {(A)+(B)}:(C)=45:55-55:45. The polyester includes a portion derived from the biphenol component (A), the bisphenol component (B) and the dicarboxylic acid component (C) in an amount of 50 mol % or more. The biphenol component (A) has formula (1)

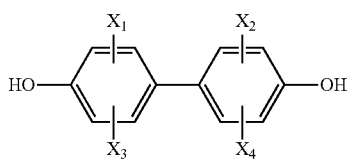
(1)

where $X_1$-$X_4$ may be the same or different and each represent a hydrogen atom, a halogen atom, or an alkyl group with 1-4 carbons. The bisphenol component (B) has formula (2)

(2)

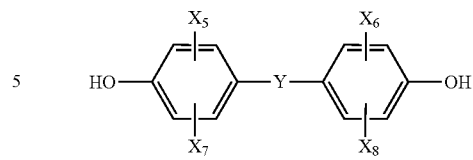

where $X_5$-$X_8$ may be the same or different and each represent a hydrogen atom, a halogen atom, or an alkyl group with 1-4 carbons, and Y represents a methylene group, an isopropylidene group, a cyclic alkylidene group, an aryl-substituted alkylidene group, an arylenedialkylidene group, —S—, —O—, a carbonyl group or —SO$_2$—. The dicarboxylic acid component (C) has formula (3)

HOOC—$R_1$—COOH (3)

where $R_1$ represents a divalent straight-chain substituent that has 2-18 main-chain atoms and may include a branch.

According to yet another aspect of the present invention, a flowability improver includes a polyester which is a polycondensate of monomers including a bisphenol component (B) and a dicarboxylic acid component (C) at a molar ratio satisfying (B):(C)=45:55-55:45. The polyester includes a portion derived from the bisphenol component (B) and the dicarboxylic acid component (C) in an amount of 50 mol % or more. The polyester has a terminal group capped by a monofunctional low molecular weight compound at a capping rate of 60% or more. The bisphenol component (B) has formula (2)

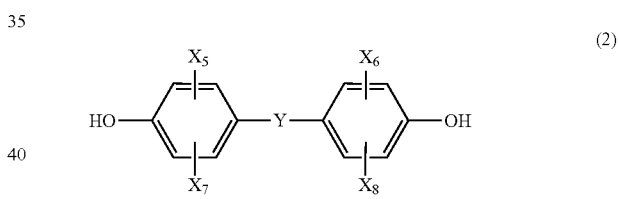
(2)

where $X_5$-$X_8$ may be the same or different and each represent a hydrogen atom, a halogen atom, or an alkyl group with 1-4 carbons, and Y represents a methylene group, an isopropylidene group, a cyclic alkylidene group, an aryl-substituted alkylidene group, an arylenedialkylidene group, —S—, —O—, a carbonyl group or —SO$_2$—. The dicarboxylic acid component (C) has formula (3)

HOOC—$R_1$—COOH (3)

where $R_1$ represents a divalent straight-chain substituent that has 2-18 main-chain atoms and may include a branch.

According to still another aspect of the present invention, a flowability improver includes a polyester which is a polycondensate of monomers including a biphenol component (A), a bisphenol component (B), and a dicarboxylic acid component (C) at a molar ratio satisfying {(A)+(B)}:(C)=45:55-55:45. The polyester includes a portion derived from the biphenol component (A), the bisphenol component (B) and the dicarboxylic acid component (C) in an amount of 50 mol % or more. The polyester has a terminal group capped by a monofunctional low molecular weight compound at a capping rate of 60% or more. The biphenol component (A) has formula (1)

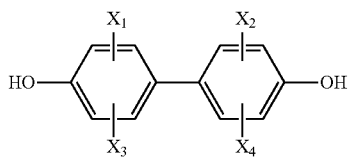

(1)

where $X_1$-$X_4$ may be the same or different and each represent a hydrogen atom, a halogen atom, or an alkyl group with 1-4 carbons. The bisphenol component (B) has formula (2)

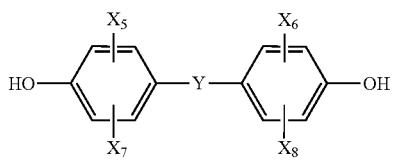

(2)

where $X_5$-$X_8$ may be the same or different and each represent a hydrogen atom, a halogen atom, or an alkyl group with 1-4 carbons, and Y represents a methylene group, an isopropylidene group, a cyclic alkylidene group, an aryl-substituted alkylidene group, an arylenedialkylidene group, —S—, —O—, a carbonyl group or —SO$_2$—. The dicarboxylic acid component (C) has formula (3)

HOOC—$R_1$—COOH    (3)

where $R_1$ represents a divalent straight-chain substituent that has 2-18 main-chain atoms and may include a branch.

According to still another aspect of the present invention, a flowability improver includes a polyester which is a polycondensate of monomers including a biphenol component (A), a bisphenol component (B), a dicarboxylic acid component (C), and a dicarboxylic acid component (D) at a molar ratio satisfying {(A)+(B)}:{(C)+(D)}=45:55-55:45. The polyester includes a portion derived from the component (A), the component (B), the component (C), and the component (D) in an amount of 50 mol % or more. The polyester has a terminal group capped by a monofunctional low molecular weight compound at a capping rate of 60% or more. The biphenol component (A) has formula (1)

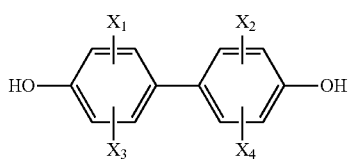

(1)

where $X_1$-$X_4$ may be the same or different and each represent a hydrogen atom, a halogen atom, or an alkyl group with 1-4 carbons. The bisphenol component (B) has formula (2)

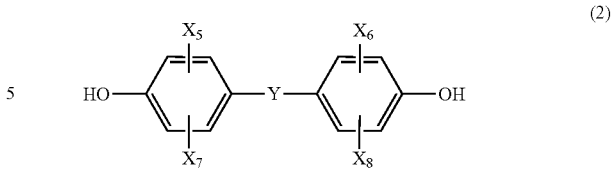

(2)

where $X_5$-$X_8$ may be the same or different and each represent a hydrogen atom, a halogen atom, or an alkyl group with 1-4 carbons, and Y represents a methylene group, an isopropylidene group, a cyclic alkylidene group, an aryl-substituted alkylidene group, an arylenedialkylidene group, —S—, —O—, a carbonyl group or —SO$_2$—. The dicarboxylic acid component (C) has formula (3)

HOOC—$R_1$—COOH    (3)

where $R_1$ represents a divalent straight-chain substituent that has 2-18 main-chain atoms and may include a branch. The dicarboxylic acid component (D) has formula (4)

HOOC—$R_2$—COOH    (4)

where $R_2$ represents a divalent straight-chain substituent that has 4-20 main-chain atoms and may include a branch, and has a larger number of main-chain atoms than that of $R_1$.

DESCRIPTION OF THE EMBODIMENTS

The embodiments will now be described with reference to the accompanying drawings, wherein like reference numerals designate corresponding or identical elements throughout the various drawings.

An embodiment of the present invention is described below. However, the present invention is not limited to this. The present invention is not limited to various structures described below. Various modifications are possible within the scope of the claims. Embodiments and examples obtained by appropriately combining technical means respectively disclosed in different embodiments and examples are also included in the technical scope of the present invention. Further, all of scientific literature and patent documents described in the present specification are incorporated by reference in the present specification. In the present specification, unless otherwise specified, "A-B" representing a numerical range means "A or more and B or less". In the present specification, "weight" and "mass" are used interchangeably and "weight %" and "mass %" are also used interchangeably.

A flowability improver according to one embodiment of the present invention contains polyester obtained by polycondensing a bisphenol component and an aliphatic dicarboxylic acid component, and, optionally, a biphenol component, at specific ratios. Further, in order to improve flowability of a polycarbonate resin and a polyarylate resin, it is preferable that the polyester be contained in an amount of 90 mass % or more with respect to the entire flowability improver.

According to one aspect of the present invention, a structure of a main chain of polyester contained in a flowability improver contains a portion derived from a bisphenol component (B) represented by the following general formula (2)

Chemical Formula 7

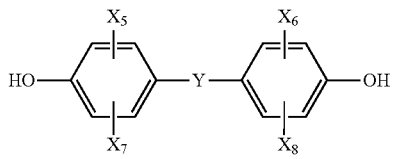

(2)

(where $X_5$-$X_8$ may be the same or different and each represent a hydrogen atom, a halogen atom, or an alkyl group with 1-4 carbons; and Y represents a methylene group, an isopropylidene group, a cyclic alkylidene group, an aryl-substituted alkylidene group, an arylenedialkylidene group, —S—, —O—, a carbonyl group or —SO$_2$—); and a dicarboxylic acid component (C) represented by the following general formula (3)

HOOC—$R_1$—COOH    (3)

(where $R_1$ represents a divalent straight-chain substituent that has 2-18 main-chain atoms and may include a branch). A molar ratio of the component (B) to the component (C) is (B):(C)=45:55-55:45, and a content rate of the portion derived from the component (B) and the component (C) in the polyester is 50 mol % or more.

Further, according to another aspect of the present invention, a structure of a main chain of polyester contained in a flowability improver contains a portion derived from a biphenol component (A) represented by the following general formula (1)

Chemical Formula 8

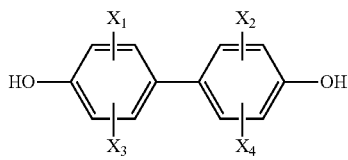

(1)

(where $X_1$-$X_4$ may be the same or different and each represent a hydrogen atom, a halogen atom, or an alkyl group with 1-4 carbons); a portion derived from a bisphenol component (B) represented by the following general formula (2)

Chemical Formula 9

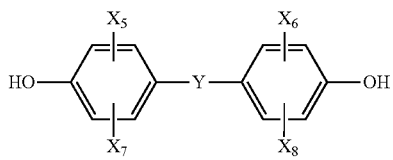

(2)

(where $X_5$-$X_8$ may be the same or different and each represent a hydrogen atom, a halogen atom, or an alkyl group with 1-4 carbons; and Y represents a methylene group, an isopropylidene group, a cyclic alkylidene group, an aryl-substituted alkylidene group, an arylenedialkylidene group, —S—, —O—, a carbonyl group or —SO$_2$—); and a portion derived from a dicarboxylic acid component (C) represented by the following general formula (3)

HOOC—$R_1$—COOH    (3)

(where $R_1$ represents a divalent straight-chain substituent that has 2-18 main-chain atoms and may include a branch) such that a molar ratio of the component (A) and the component (B) to the component (C) is {(A)+(B)}:(C)=45:55-55:45, and a content rate of a portion derived from the component (A), the component (B) and the component (C) is 50 mol % or more.

Further, according to another aspect of the present invention, a structure of a main chain of polyester contained in a flowability improver contains a portion derived from a biphenol component (A) represented by the following general formula (1)

Chemical Formula 10

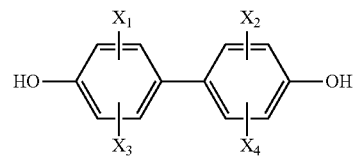

(1)

(where $X_1$-$X_4$ may be the same or different and each represent a hydrogen atom, a halogen atom, or an alkyl group with 1-4 carbons); a portion derived from a bisphenol component (B) represented by the following general formula (2)

Chemical Formula 11

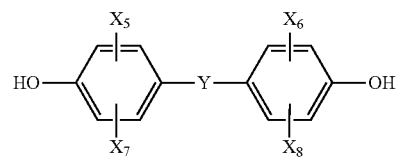

(2)

(where $X_5$-$X_8$ may be the same or different and each represent a hydrogen atom, a halogen atom, or an alkyl group with 1-4 carbons; and Y represents a methylene group, an isopropylidene group, a cyclic alkylidene group, an aryl-substituted alkylidene group, an arylenedialkylidene group, —S—, —O—, a carbonyl group or —SO$_2$—); a portioned derived from a dicarboxylic acid component (C) represented by the following general formula (3)

HOOC—$R_1$—COOH    (3)

(where $R_1$ represents a divalent straight-chain substituent that has 2-18 main-chain atoms and may include a branch); and a portion derived from a dicarboxylic acid component (D) represented by the following general formula (4)

HOOC—$R_2$—COOH    (4)

(where $R_2$ represents a divalent straight-chain substituent that has 4-20 main-chain atoms and may include a branch, and has a larger number of main-chain atoms than that of $R_1$) such that a molar ratio of the component (A) and the component (B) to the component (C) and the component (D) is {(A)+(B)}:{(C)+(D)}=45:55-55:45, and a content rate of a portion derived from the component (A), the component (B), the component (C) and the component (D) is 50 mol % or more.

The polyester contained in the flowability improver is manufactured by polycondensing a diol component and a dicarboxylic acid component, the diol component including the bisphenol component (B) and the optional biphenol component (A), and the dicarboxylic acid component including the component (C) and the optional component (D).

Since the polyester is not a low molecular weight compound, when a resin composition formed from a polycarbonate resin or a polyarylate resin by adding the flowability improver is molded, occurrence of bleed out can be suppressed.

Further, the polyester having the above-described molecular structure has a high compatibility with the polycarbonate resin and the polyarylate resin, by adding a small amount of the polyester, flowability of a resin composition obtained by adding the flowability improver to a polycarbonate resin or a polyarylate resin can be efficiently improved, and various inherent properties such as transparency and impact strength of the polycarbonate resin and the polyarylate resin are not ruined.

When the component (A) and the component (B) are used as the diol component, a molar ratio ((A)/(B)) of the component (A) to the component (B) is preferably 1/9-9/1, more preferably 1/7-7/1, even more preferably 1/5-5/1, and most preferably 1/3-1/1. When the amount of the component (A) is further reduced such that the molar ratio ((A)/(B)) is less than 1/9, the polyester itself becomes completely amorphous, and glass transition temperature is lowered, and thus it may cause fusion of pellets of the flowability improver during storage. When the amount of the component (B) is further reduced such that the molar ratio ((A)/(B)) is more than 9/1, the compatibility with the polycarbonate resin or the polyarylate resin becomes insufficient, and when the resin composition obtained by adding the flowability improver to the polycarbonate resin or the polyarylate resin is molded into a thick molded article having a thickness of 4 mm or more, phase separation may occur at a central portion in a thickness direction when the molded article is slowly cooled.

It is possible that the component (C) alone is copolymerized as the dicarboxylic acid component, or it is also possible that the component (C) and the component (D) are copolymerized as the dicarboxylic acid component and function as a desired flowability improver. In particular, when a large amount of the component (A) is used with respect to the component (B), the polyester tends to become brittle and processing such pelletization becomes difficult. In this case, by copolymerizing the component (D), processing such as pelletization of the polyester becomes easy.

A molar ratio ((C)/(D)) of the component (C) to the component (D) when the component (C) and the component (D) are copolymerized is arbitrary, but is preferably 8/1-1/8, more preferably 6/1-1/4, even more preferably 4/1-1/1, and most preferably 3/1-2/1. When one of the component (C) and the component (D) is further increased or reduced such that the molar ratio ((C)/(D)) is greater than 8/1 or smaller than 1/8, crystallinity of the polyester increases and thus the polyester becomes brittle and pelletization of the polyester may become difficult. Further, that a copolymerization ratio of the component (C), which has a smaller number of main-chain atoms than that of the component (D), is set to be larger than that of the component (D) is preferable in that the glass transition temperature of the flowability improver is increased and thereby, heat resistance of a resin composition obtained by adding the flowability improver to a polycarbonate resin or a polyarylate resin can be increased.

A molar ratio ({(A)+(B)}:{(C)+(D)}) of the component (A) and the component (B) to the component (C) and the component (D) is 45:55-55:45. Further, in order to efficiently increase the molecular weight of the obtained polyester, the molar ratio is preferably 48:52-52:48, and more preferably 50:50. However, in the polyester, it is possible that both the component (A) and the component (D) are 0 moles or one of the component (A) and the component (D) is 0 moles.

In the general formula (1), $X_1$-$X_4$ may be the same or different and each represent a hydrogen atom, a halogen atom, or an alkyl group having 1-4 carbon atoms. In order to improve the crystallinity of the flowability improver itself and to improve handling such as preventing fusion during pellet storage, it is more preferable that $X_1$-$X_4$ be all hydrogen atoms.

In the general formula (2), $X_5$-$X_8$ may be the same or different and each represent a hydrogen atom, a halogen atom, or an alkyl group having 1-4 carbon atoms. In order to improve compatibility with the polycarbonate resin and the polyarylate resin, it is more preferable that $X_5$-$X_8$ be all hydrogen atoms. Y represents a methylene group, an isopropylidene group, a cyclic alkylidene group, an aryl-substituted alkylidene group, an arylenedialkylidene group, —S—, —O—, a carbonyl group or —$SO_2$—.

As the bisphenol component represented by the general formula (2), in particular, 2,2-bis(4-hydroxyphenyl) propane [common name: bisphenol A] is preferable in that the compatibility with the polycarbonate resin and the polyarylate resin is increased. Examples of divalent phenol other than the bisphenol A include: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)arylalkanes such as 2,2-bis(4-hydroxyphenyl)phenylmethane and bis(4-hydroxyphenyl)naphthylmethane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyaryl ethers such as 4,4'-dihydroxyphenyl ether and 4,4'-dihydroxy-3,3'-dimethylphenyl ether; dihydroxy diaryl sulfides such as 4,4'-dihydroxydiphenyl sulfide and 4,4'-dihydroxy-3,3'-dimethyl diphenyl sulfide; dihydroxy diaryl sulfoxides such as 4,4'-dihydroxydiphenyl sulfoxide and 4,4'-dihydroxy-3,3'-dimethyldiphenyl sulfoxide; dihydroxy diaryl sulfones such as 4,4'-dihydroxydiphenyl sulfone and 4,4'-dihydroxy-3,3'-dimethyl diphenyl sulfone; dihydroxydiphenyls such as 4,4'-dihydroxydiphenyl; and the like. These bisphenol components may each be independently used, or two or more of these bisphenol components may be used in combination to an extent that the effects are not lost.

A terminal structure of the flowability improver is not particularly limited. However, particularly, from a point of view of allowing transesterification with the polycarbonate resin and the polyarylate resin to be suppressed and allowing yellowing in the resin composition obtained by adding the flowability improver to the polycarbonate resin or to the polyarylate resin to be suppressed, it is preferable that the terminal structure of the flowability improver be capped by a monofunctional low molecular weight compound.

Further, a capping rate with respect to all terminal groups of a molecular chain is preferably 60% or more, more preferably 70% or more, even more preferably 80% or more, and most preferably 90% or more.

A terminal capping rate of the flowability improver can be obtained from the following formula (5) by measuring the number of terminal functional groups that are capped and the number of terminal functional groups that are not capped. As a specific calculation method of the terminal capping rate, from a point of view of accuracy and simplicity, a method is preferable in which the number of terminal groups is obtained from an integral value of a characteristic signal corresponding to the terminal groups by using $^1$H-NMR and, based on the result, the terminal capping rate is calculated using the following formula (5).

Terminal capping rate (%)={[number of capped terminal functional groups]/([number of capped terminal functional groups]+[number of uncapped terminal functional groups])}×100 (5)

Examples of the monofunctional low molecular weight compound used for capping include monovalent phenol, monoamine with 1 to 20 carbon atoms, and aliphatic monocarboxylic acid. Specific examples of monovalent phenol include phenol, p-cresol, p-t-butylphenol, p-t-octylphenol, p-cumyl phenol, p-nonylphenol, p-t-amylphenol, 4-hydroxybiphenyl, and any mixture thereof, and the like. Specific examples of aliphatic monocarboxylic acid include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid, and any mixture thereof, and the like. Among these, from a viewpoint of easy polymerization, compounds having high boiling points such as myristic acid, palmitic acid and stearic acid are preferable. Specific examples of monoamine include aliphatic monoamines such as methylamine, ethylamine, propyl amine, butylamine, hexylamine, octylamine, decylamine, stearylamine, dimethylamine, diethylamine, dipropylamine, dibutylamine, and any mixture thereof, and the like.

In the component (C), $R_1$ in the following general formula (3)

HOOC—$R_1$—COOH (3)

represents a divalent straight-chain substituent that has 2-18 main-chain atoms and may include a branch. Here, the number of main-chain atoms is the number of atoms of a main chain skeleton. For example, when —$R_1$— is —$(CH_2)_8$—, the number of main-chain atoms is the number of carbon atoms and is "8". From a point of view that the melt viscosity of the flowability improver itself decreases, $R_1$ is preferably a straight-chain substituent that does not include a branch, and more preferably a linear aliphatic hydrocarbon chain that does not include a branch. Further, $R_1$ may be saturated or unsaturated, but is preferably a saturated aliphatic hydrocarbon chain. When an unsaturated bond is included, the polyester may not have sufficient flexibility, and it may cause an increase in the melt viscosity of the flowability improver itself. From a point of view of both facilitating polymerization of the polyester and allowing the glass transition point to be increased, $R_1$ is preferably a linear saturated aliphatic hydrocarbon chain with 2-18 carbon atoms, more preferably a linear saturated aliphatic hydrocarbon chain with 4-16 carbon atoms, even more preferably a linear saturated aliphatic hydrocarbon chain with 8-14 carbon atoms, and most preferably linear saturated aliphatic hydrocarbon chain with 8 carbon atoms. Improvement in the glass transition point of the polyester leads to improvement in the heat resistance of the resin composition obtained by adding the flowability improver to the polycarbonate resin or the polyarylate resin. From a point of view that the melt viscosity of the flowability improver itself decreases, it is preferable that the number of main-chain atoms of $R_1$ be an even number. From the above point of view, it is preferable that $R_1$ be one selected particularly from —$(CH_2)_8$—, —$(CH_2)_{10}$— and —$(CH_2)_{12}$—.

In the component (D), $R_2$ in the following general formula (4)

HOOC—$R_2$—COOH (4)

represents a divalent straight-chain substituent that has 4-20 main-chain atoms and may include a branch, and has a larger number of main-chain atoms than that of $R_1$. From a point of view that the melt viscosity of the flowability improver itself decreases, $R_2$ is preferably a straight-chain substituent that does not include a branch, and is preferably a linear aliphatic hydrocarbon chain that does not include a branch. Further, $R_2$ may be saturated or unsaturated, but is preferably a saturated aliphatic hydrocarbon chain. When an unsaturated bond is included, the polyester may not have sufficient flexibility, and it may cause an increase in the melt viscosity of the flowability improver itself. $R_2$ is preferably a linear saturated aliphatic hydrocarbon chain with 4-20 carbon atoms, more preferably a linear saturated aliphatic hydrocarbon chain with 8-18 carbon atoms, and even more preferably a linear saturated aliphatic hydrocarbon chain with 10-18 carbon atoms. From a point of view that the melt viscosity of the flowability improver itself decreases, it is preferable that the number of main-chain atoms of $R_2$ be an even number. The larger the difference in the number of main-chain atoms between $R_1$ and $R_2$, the more the crystallinity of the flowability improver decreases and the more the processability of the flowability improver into pellets increases. In particular, from a point of view that polyester having low crystallinity and excellent processability can be obtained, it is preferable that the numbers (m) and (n) of main-chain atoms of portions corresponding to $R_1$ and $R_2$ satisfy the following general formula (6).

$n-m \geq 4$ (6)

From a point of view of chemical stability and availability, it is preferable that $R_2$ be one selected particularly from —$(CH_2)_{10}$—, —$(CH_2)_{12}$— and —$(CH_2)_{18}$—.

The polyester contained in the flowability improver may also be copolymerized with other monomers to such an extent that the effect thereof is not lost. Examples of the other monomers include aromatic hydroxycarboxylic acid, aromatic dicarboxylic acid, aromatic diol, aromatic hydroxyamine, aromatic diamine, aromatic aminocarboxylic acid or caprolactams, caprolactones, aliphatic dicarboxylic acid, aliphatic diol, aliphatic diamine, alicyclic dicarboxylic acid and alicyclic diol, aromatic mercaptocarboxylic acid, aromatic dithiol and aromatic mercaptophenol.

However, a content rate of the other monomers that form the polyester is less than 50 mol % with respect to the number of moles of the entire polyester, preferably less than 30 mol %, more preferably less than 10 mol %, and most preferably less than 5 mol %. When the content rate of the other monomers is 50 mol % or more with respect to the number of moles of the entire polyester, the compatibility of the polyester with respect to the polycarbonate resin and the polyarylate resin decreases, and it becomes difficult for the polyester to be compatible with the polycarbonate resin and the polyarylate resin.

Specific examples of the aromatic hydroxycarboxylic acid include 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxyphenyl-4-benzoic acid, 3'-hydroxyphenyl-4-benzoic acid, 4'-hydroxyphenyl-3-benzoic acid, and alkyl, alkoxy or halogen substituents thereof, and the like.

Specific examples of the aromatic dicarboxylic acid include terephthalic acid, isophthalic acid, 2,6-naphthalene dicarboxylic acid, 1,6-naphthalene dicarboxylic acid, 2,7-naphthalenedicarboxylic acid, 4,4'-dicarboxybiphenyl, 3,4'-dicarboxybiphenyl, 4,4"-dicarboxyteraphenyl, bis(4-carboxyphenyl) ether, bis(4-carboxyphenoxy) butane, bis(4-carboxyphenyl) ethane, bis(3-carboxyphenyl) ether, bis(3-carboxyphenyl) ethane, and alkyl, alkoxy or halogen substituents thereof, and the like.

Specific examples of the aromatic diol include pyrocatechol, hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenol ether, bis(4-hydroxyphenyl) ethane, 2,2'-dihydroxybinaphthyl, and alkyl, alkoxy or halogen substituents thereof, and the like.

Specific examples of the aromatic hydroxyamine include 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenylmethane, 4-amino-4'-hydroxybiphenyl sulfide, 2,2'-diaminobinaphthyl, and alkyl, alkoxy or halogen substituents thereof, and the like.

Specific examples of the aromatic diamine and the aromatic aminocarboxylic acid include 1,4-phenylenediamine, 1,3-phenylenediamine, N-methyl-1,4-phenylenediamine, N,N'-dimethyl-1,4-phenylenediamine, 4,4'-diaminophenyl sulfide (thiodianiline), 4,4'-diaminobiphenyl sulfone, 2,5-diaminotoluene, 4,4'-ethylenedianiline, 4,4'-diaminobiphenoxyethane, 4,4'-diaminobiphenylmethane (methylenedianiline), 4,4'-diaminobiphenyl ether (oxydianiline), 4-aminobenzoic acid, 3-aminobenzoic acid, 6-amino-2-naphthoic acid, 7-amino-2-naphthoic acid, and alkyl, alkoxy or halogen substituents thereof, and the like.

Specific examples of the aliphatic dicarboxylic acid include oxalic acid, malonic acid, succinic acid, glutaric acid, adipic acid, pimelic acid, suberic acid, azelaic acid, sebacic acid, dodecanedioic acid, tetradecanedioic acid, fumaric acid, maleic acid and the like.

Specific examples of the aliphatic diamine include 1,2-ethylenediamine, 1,3-trimethylenediamine, 1,4-tetramethylenediamine, 1,6-hexamethylenediamine, 1,8-octanediamine, 1,9-nonanediamine, 1,10-decanediamine, and 1,12-dodecanediamine, and the like.

Specific examples of the alicyclic dicarboxylic acid, the aliphatic diol and the alicyclic diol include linear or branched aliphatic diols such as hexahydroterephthalic acid, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, ethylene glycol, propylene glycol, butylene glycol, 1,3-propanediol, 1,2-propanediol, 1,4-butanediol, 1,6-hexanediol, 1,8-octanediol, 1,10-decanediol, 1,12-dodecanediol, neopentyl glycol, and reactive derivatives thereof, and the like.

Specific examples of the aromatic mercaptocarboxylic acid, the aromatic dithiol and the aromatic mercaptophenol include 4-mercaptobenzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercaptophenol, 3-mercaptophenol, 6-mercapto-2-hydroxynaphthalene, 7-mercapto-2-hydroxynaphthalene, and reactive derivatives thereof, and the like.

From a point of view that a resin composition having a good color tone can be obtained, it is preferable that the flowability improver contain a phosphite-based antioxidant in advance. The reason is because discoloration of the flowability improver itself is prevented, and because a polymerization catalyst used in the polymerization of the polyester contained in the flowability improver can be deactivated and discoloration due to transesterification or hydrolysis reaction between the polyester contained in the flowability improver and the polycarbonate resin or the polyarylate resin, which may occur when the flowability improver and the polycarbonate resin or the polyarylate resin are mixed, can be prevented. As a result, reduction in the molecular weight of the polycarbonate resin or the polyarylate resin can be more effectively suppressed, and thus the resin composition containing the flowability improver allows the flowability only to be improved without ruining inherent properties of the polycarbonate resin or the polyarylate resin. A content of the phosphite-based antioxidant in the flowability improver is preferably 0.005-5 mass %, more preferably 0.01-2 mass %, even more preferably 0.01-1 mass %, and most preferably 0.02-0.05 mass %, with respect to a weight of the polyester contained in the flowability improver. When the content of the phosphite-based antioxidant is less than 0.005 mass %, the content of the phosphite-based antioxidant is small and coloring may occur when the flowability improver is blended in the polycarbonate resin or the polyarylate resin. Further, when the content of the phosphite-based antioxidant is more than 5 mass %, the impact strength of the resin composition obtained by adding the flowability improver to the polycarbonate resin or the polyarylate resin may be decreased.

As phosphite-based antioxidants, various compounds are known, and, for example, various compounds are described in "Antioxidant Handbook" published by Taiseisha, "Polymer Material Degradation and Stabilization" (pages 235-242) published by CMC Publishing Co., Ltd., and the like. However, phosphite-based antioxidants are not limited to these. Examples of the phosphite-based antioxidant include tris(2,4-di-t-butylphenyl) phosphite, bis[2,4-bis(1,1-dimethylethyl)-6-methylphenyl] ethyl ester phosphorous acid, bis(2,4-di-t-butylphenyl) pentaerythritol diphosphite, bis(2,4-dicumylphenyl) pentaerythritol diphosphite, bis(2,6-di-t-butyl-4-methylphenyl) pentaerythritol-di-phosphite, and the like. Examples of product names include: Adekastab PEP-36, Adekastab PEP-4C, Adekastab PEP-8, Adekastab PEP-8F, Adekastab PEP-8W, Adekastab PEP-11C, Adekastab PEP-24G, Adekastab HP-10, Adekastab 2112, Adekastab 260, Adekastab P, Adekastab QL, Adekastab 522A, Adekastab 329K, Adekastab 1178, Adekastab 1500, Adekastab C, Adekastab 135A, Adekastab 3010, and Adekastab TPP (all of these are manufactured by Adeka Corporation); Irgafos 38, Irgafos 126, Irgafos 168, and Irgafos P-EPQ (all of these are manufactured by BASF Japan Ltd.); and the like. Among these, in particular, from a point of view that the effect of suppressing transesterification reaction and the hydrolysis reaction can be remarkably demonstrated and that the antioxidant itself has a high melting point and is unlikely to volatilize from the resin, Adekastab PEP-36, Adekastab HP-10, Adekastab 2112, Adekastab PEP-24G, Irgafos 126 and the like are more preferable.

From a point of view that a polycarbonate resin composition and a polyarylate resin composition having a good color tone can be obtained, it is preferable that, in addition to the phosphite-based antioxidant, the flowability improver contain a hindered phenol-based antioxidant in advance. A content of the hindered phenol-based antioxidant in the flowability improver is preferably 0.005-5 mass %, more preferably 0.01-2 mass %, even more preferably 0.01-1 mass %, and most preferably 0.02-0.05 mass %, with respect to the weight of the polyester contained in the flowability improver. When the content of the hindered phenol-based antioxidant is less than 0.005 mass %, the content of the hindered phenol-based antioxidant is small and coloring may occur when the flowability improver is blended in the polycarbonate resin or the polyarylate resin. When the content of the hindered phenol-based antioxidant is more than 5 mass %, the impact strength of the resin composition obtained by adding the flowability improver to the polycarbonate resin or the polyarylate resin may be decreased.

Examples of the hindered phenol-based antioxidant include 2,6-di-t-butyl-4-methylphenol, 2,6-di-t-butyl-4-ethylphenol, mono (or di, or tri) (α-methylbenzyl) phenol, 2,2'-methylenebis (4-ethyl-6-t-butylphenol), 2,2'-methylenebis (4-methyl-6-t-butylphenol), 4,4'-butylidenebis (3-methyl-6-t-butylphenol), 4,4'-thiobis (3-methyl-6-t-butylphenol), 2,5-di-t-butylhydroquinone, 2,5-di-t-amylhydroquinone, triethylene glycol-bis-[3-(3-t-butyl-5-methyl-4-hydroxyphenyl) propionate] 1,6-hexanediol-bis [3-(3,5-di-t-butyl-4-hydroxyphenyl) propionate], 2,4-bis-(n-octylthio)-6-(4-hydroxy-3,5-di-t-butylanilino)-1,3,5-triazine, pentaerythritol tetrakis [3-(3,5-di-t-butyl-4-hydroxyphenyl) propionate], 2,2-thio-diethylene bis[3-(3,5-di-t-butyl-4-hydroxyphenyl) propionate], octadecyl-3-(3,5-di-t-butyl-4-hydroxyphenyl) propionate, N,N'-hexamethylenebis (3,5-di-t-butyl-4-hydroxy-hydrocinnamamide), 3,5-di-t-butyl-4-hydroxy-benzylphosphonate-diethyl ester, 1,3,5-trimethyl-2,4,6-tris(3,5-di-t-butyl-4-hydroxybenzyl) benzene, calcium bis(ethyl 3, 5-di-t-butyl-4-hydroxybenzylphosphonate), tris-(3,5-di-t-butyl-4-hydroxybenzyl) isocyanurate, 2,4-bis[(octylthio) methyl] o-cresol, N,N'-bis[3-(3,5-di-t-butyl-4-hydroxyphenyl) propionyl] hydrazine, tris(2,4-di-t-butylphenyl) phosphite, 2-(5-methyl-2-hydroxyphenyl) benzotriazole, 2-[2-hydroxy-3, 5-bis (α, α-dimethylbenzyl) phenyl]-2H-benzotriazole, 2-(3,5-di-t-butyl-2-hydroxyphenyl) benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl) benzotriazole, 2-(2'-hydroxy-5'-t-octylphenyl)-benzotriazole, a condensate of methyl-3-[3-t-butyl-5-(2H-benzotriazol-2-yl)-4-hydroxyphenyl] propionate and polyethylene glycol (having a molecular weight of about 300), hydroxyphenylbenzotriazole derivatives, 2-(3,5-di-t-butyl-4-hydroxybenzyl)-2-n-butyl malonate bis(1,2,2,6,6-pentamethyl-4-piperidyl), 2,4-di-t-butylphenyl-3,5-di-t-butyl-4-hydroxybenzoate, and the like.

Examples of product names include: Nocrac 200, Nocrac M-17, Nocrac SP, Nocrac SP-N, Nocrac NS-5, Nocrac NS-6, Nocrac NS-30, Nocrac 300, Nocrac NS-7, and Nocrac DAH (all of these are manufactured by Ouchi Shinko Chemical Industry Co., Ltd.); Adekastab AO-30, Adekastab AO-40, Adekastab AO-50, Adekastab AO-60, Adekastab AO-616, Adekastab AO-635, Adekastab AO-658, Adekastab AO-80, Adekastab AO-15, Adekastab AO-18, Adekastab 328, and Adekastab AO-37 (all of these are manufactured by Adeka Corporation); IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330, IRGANOX-1425 WL (all of these are manufactured by BASF Japan Ltd.); Sumilizer GA-80 (manufactured by Sumitomo Chemical Co., Ltd.); and the like. Among these, from a point of view that the antioxidant itself is unlikely to discolor and that coloring of the resin can be efficiently suppressed by being used in combination with the phosphite-based antioxidant, Adekastab AO-60, IRGANOX-1010 and the like are more preferable.

Further, as a phenol-based antioxidant, a monoacrylate phenol-based stabilizer having both an acrylate group and a phenol group can also be used. Examples of the monoacrylate phenol-based stabilizer include 2-t-butyl-6-(3-t-butyl-2-hydroxy-5-methylbenzyl)-4-methylphenyl acrylate (product name: Sumilizer GM), 2,4-di-t-amyl-6-[1-(3,5-di-t-amyl-2-hydroxyphenyl) ethyl] phenyl acrylate (product name: Sumilizer GS), and the like.

As a combination of a phosphite-based antioxidant and a hindered phenol-based antioxidant, a combination of Adekastab PEP-36 or Irgafos 126 and Adekastab AO-60 or IRGANOX-1010 is preferable in that coloring of the resin can be particularly suppressed.

The number average molecular weight of the polyester contained in the flowability improver is a value measured using GPC at 80° C. using polystyrene as a standard substance and using a solution prepared by dissolving the resin in a mixed solvent of p-chlorophenol and toluene at a volume ratio of 3:8 such that concentration of the solution becomes 0.25 weight %. The number average molecular weight of the polyester is preferably 10000-30000, more preferably 11000-20000, even more preferably 12000-17000. When the number average molecular weight of the polyester is less than 10000, the flowability improver may bleed out when a resin composition obtained by adding the flowability improver to the polycarbonate resin or the polyarylate resin is molded. Further, when the number average molecular weight of the polyester exceeds 30000, the melt viscosity of the flowability improver itself increases and it is possible that flowability during a molding process of the resin composition obtained by adding the flowability improver to the polycarbonate resin or the polyarylate resin cannot be effectively improved.

The polyester contained in the flowability improver may be manufactured using any commonly known method. An example of the manufacturing method is a method in which hydroxyl groups of the monomers are individually or collectively converted to lower fatty acid ester using lower fatty acid such as acetic anhydride and thereafter a lower fatty acid-eliminating polycondensation reaction with carboxylic acid is carried out in a separate reaction tank or the same reaction tank. The polycondensation reaction is carried out in a state in which substantially no solvent is present, and usually, at a temperature of 220-330° C., preferably 240-310° C., in the presence of an inert gas such as a nitrogen gas, under an atmospheric pressure or a reduced pressure, for 0.5-5 hours. The reaction progresses slowly when the reaction temperature is lower than 220° C., and a side reaction such as decomposition is likely to occur when the reaction temperature is higher than 330° C. When the reaction is carried out under a reduced pressure, it is preferable that a pressure reduction degree be increased stepwise. When the pressure is suddenly reduced to a high degree of vacuum, a dicarboxylic acid monomer and a low molecular weight compound used for terminal capping are volatilized, and it is possible that a resin having a desired composition or molecular weight cannot be obtained. An ultimate degree of vacuum is preferably 40 Torr or less, more preferably 30 Torr or less, even more preferably 20 Torr or less, and particularly preferably 10 Torr or less.

When the ultimate degree of vacuum is higher than 40 Torr, it may be possible that acid elimination does not proceed sufficiently and polymerization time may be long. It is also possible that the polycondensation reaction is carried out by adopting multi-stage reaction temperatures, and in some cases, a reaction product can be taken out in a melted state and collected while the reaction temperature is rising or immediately after the reaction temperature reaches a maximum temperature. The obtained polyester resin may be used as it is. Further, unreacted raw material can be removed from the polyester resin, or additional solid phase polymerization can be carried out with an intention of improving physical properties of the polyester resin. When the solid phase polymerization is carried out, it is preferable that the obtained polyester resin is mechanically pulverized into particles having a particle diameter of 3 mm or less, preferably 1 mm or less, and is processed for 1-30 hours in the solid phase state at 100-350° C. in an atmosphere of an inert gas such as nitrogen gas or under a reduced pressure. It is not preferable for the particle diameter of the particles of the polyester resin to be more than 3 mm because processing is insufficient and problems in physical properties occur. It is preferable that a processing temperature and a rate of temperature increase during the solid phase polymerization be selected such that fusion of the particles of the polyester resin does not occur.

Examples of acid anhydride of the lower fatty acid used for manufacturing the polyester contained in the flowability improver include acid anhydrides of lower fatty acids with 2-5 carbon atoms such as acetic anhydride, propionic anhydride, chloroacetic anhydride, dichloroacetic anhydride, trichloroacetic anhydride, bromoacetic anhydride, dibromoacetic anhydride, tribromoacetic anhydride, fluoroacetic anhydride, difluoroacetic anhydride, trifluoroacetic anhydride, butyric anhydride, isobutyric anhydride, valeric anhydride, pivalic anhydride, and the like. Among these, acetic anhydride, propionic anhydride and trichloroacetic anhydride are particularly preferably used. An amount of the acid anhydride of the lower fatty acid to be used is 1.01-1.5 equivalents, preferably 1.02-1.2 equivalents, with respect to a sum of functional groups such as hydroxyl groups of the monomers to be used. When the amount of the acid anhydride of the lower fatty acid to be used is less than 1.01 equivalents, due to volatilization of the acid anhydride of the lower fatty acid, it is possible that functional groups such as hydroxyl groups insufficiently react with the anhydride of the lower fatty acid, so that a low molecular weight resin is obtained.

A polymerization catalyst may be used in the manufacture of the flowability improver. As the polymerization catalyst, catalysts that are conventionally known as polymerization catalysts of polyester can be used, for example, metal salt catalysts such as magnesium acetate, stannous acetate, tetrabutyl titanate, lead acetate, sodium acetate, potassium acetate and antimony trioxide, and organic compound catalysts such as N,N-dimethylaminopyridine and N-methyl imidazole can be used. Among these, from a point of view that discoloration of the flowability improver itself can be prevented and that discoloration of the polycarbonate resin composition or the polyarylate resin composition can be prevented, sodium acetate, potassium acetate, and magnesium acetate are more preferable.

The smaller the addition amount of the polymerization catalyst, the more the molecular weight reduction and yellowing in the polycarbonate resin or the polyarylate resin can be suppressed. Therefore, the addition amount of the polymerization catalyst is usually $0.1 \times 10^{-3}$-$100 \times 10^{-2}$ weight %, preferably $0.5 \times 10^{-3}$-$50 \times 10^{-2}$ weight %, with respect to a total weight of the polyester resin.

The flowability improver is not particularly limited in shape or form. For example, the flowability improver may have a pellet-like, flake-like, or powder-like shape or form. The particle diameter of the flowability improver needs to be small enough to allow the flowability improver to be put into an extruder that melts and kneads the flowability improver with the polycarbonate resin or the polyarylate resin, and is preferably 6 mm or less.

The resin composition obtained by adding the flowability improver to the polycarbonate resin or the polyarylate resin contains 80-99.9 mass % of the polycarbonate resin or the polyarylate resin and 0.1-20 mass % of the flowability improver. The content rate of the flowability improver in the resin composition (100 mass %) is more preferably 0.5 mass % or more, even more preferably 1 mass % or more, and particularly preferably 3 mass % or more. The content rate of the flowability improver in the resin composition (100 mass %) is more preferably 15 mass % or less, even more preferably 10 mass % or less, and particularly preferably 5 mass % or less. When the content rate of the flowability improver in resin composition (100 mass %) is 0.1 mass % or more, flowability during a molding process improves. When the content rate of the flowability improver in resin composition (100 mass %) is 20 mass % or less, heat resistance and mechanical properties of the polycarbonate resin and the polyarylate resin are not significantly ruined. The glass transition temperature of the flowability improver is lower than that of the polycarbonate resin and the polyarylate resin. Therefore, the glass transition temperature of the resin composition obtained by compatibilizing the flowability improver with the polycarbonate resin or the polyarylate resin is lowered. Therefore, when the content rate of the flowability improver exceeds 20 mass %, the heat resistance of the obtained resin composition may decrease.

The flowability improver may contain a phosphite-based antioxidant in advance. The resin composition obtained by adding the flowability improver to a polycarbonate resin or a polyarylate resin may further contain a phosphite-based antioxidant, regardless of whether or not the flowability improver contains a phosphite-based antioxidant in advance. When the flowability improver does not contain a phosphite-based antioxidant in advance, a content of the phosphite-based antioxidant is preferably 0.005-5 mass %, more preferably 0.01-2 mass %, even more preferably 0.01-1 mass %, and most preferably 0.02-0.05 mass % with respect to a total mass of the polycarbonate resin or the polyarylate resin and the flowability improver.

The flowability improver may further contain a hindered phenol-based antioxidant in advance. When a phosphate-based antioxidant is contained in a resin composition obtained by adding the flowability improver to a polycarbonate resin or a polyarylate resin (when a phosphite-based antioxidant is contained in the flowability improver in advance or when a phosphite-based antioxidant is separately contained in the resin composition), the resin composition may further contain a hindered phenol-based antioxidant regardless whether or not a hindered phenol-based antioxidant is contained in the flowability improver in advance. When the flowability improver does not contain a hindered phenol-based antioxidant in advance, a content of the hindered phenol-based antioxidant is preferably 0.005-5 mass %, more preferably 0.01-2 mass %, even more preferably 0.01-1 mass %, and most preferably 0.02-0.05 mass % with respect to a total mass of the polycarbonate resin or the polyarylate resin and the flowability improver.

The polycarbonate resin is not particularly limited, and a polycarbonate resin having various structural units can be used. For example, a polycarbonate resin manufactured using method in which divalent phenol and carbonyl halide are subjected to interfacial polycondensation, or a method in which divalent phenol and carbonic acid diester are melt-polymerized (transesterification method), can be used.

Examples of the divalent phenol, which is a raw material of the polycarbonate resin, include 4,4'-dihydroxybiphenyl, bis(4-hydroxyphenyl) methane, 1,1-bis(4-hydroxyphenyl) ethane, 2,2-bis(4-hydroxyphenyl) propane, 2,2-bis(3-methyl-4-hydroxyphenyl) propane, 2,2-bis(3,5-dimethyl-4-hydroxyphenyl) propane, 1,1-bis(4-hydroxyphenyl) cyclohexane, bis(4-hydroxyphenyl) ether, bis(4-hydroxyphenyl) sulfide, bis(4-hydroxyphenyl) sulfone, bis(4-hydroxyphenyl) sulfoxide, bis(4-hydroxyphenyl) ketone, hydroquinone, resorcin, catechol, and the like. Among these divalent phenols, bis(hydroxyphenyl) alkanes are preferable, and further, divalent phenol having 2,2-bis(4-hydroxyphenyl) propane as a main raw material is particularly preferable. Further, examples of a carbonate precursor include carbonyl halide, carbonyl ester, haloformate, and the like. Specific examples include phosgene; diaryl carbonates such as divalent phenol dihaloformate, diphenyl carbonate, ditolyl carbonate, bis (chlorophenyl) carbonate and m-cresyl carbonate; aliphatic carbonate compounds such as dimethyl carbonate, diethyl carbonate, diisopropyl carbonate, dibutyl carbonate, diamyl carbonate and dioctyl carbonate; and the like.

Further, in addition to a resin of which a molecular structure of a polymer chain is a linear chain structure, the polycarbonate resin may also be a resin having a branched structure in a polymer chain. Examples of a branching agent for introducing such a branched structure include 1,1,1-tris (4-hydroxyphenyl) ethane, α,α',α''-tris(4-hydroxyphenyl)-1,3, 5-triisopropylbenzene, phloroglucin, trimellitic acid, isatinbis (o-cresol), and the like. Further, as a molecular weight regulator, phenol, p-t-butylphenol, p-t-octylphenol, p-cumylphenol and the like can be used.

Further, in addition to a homopolymer manufactured using only divalent phenol, the polycarbonate resin used may also be a copolymer having a polycarbonate structural unit and a polyorganosiloxane structural unit, or a resin composition formed from these homopolymer and copolymer. Further, the polycarbonate resin may also be a polyester-polycarbonate resin obtained by carrying out a polymerization reaction of divalent phenol and the like in the presence of bifunctional carboxylic acid such as terephthalic acid or an ester precursor thereof such as an ester forming derivative. Further, a resin composition obtained by melt-kneading a polycarbonate resin having various structural units can also be used.

The polyarylate resin is polyester formed of an aromatic dicarboxylic acid residue and a bisphenol residue. The polyarylate resin can be manufactured using a commonly known method such as a melt polymerization method or an interfacial polymerization method.

Examples of an aromatic dicarboxylic acid that forms the aromatic dicarboxylic acid residue in the polyarylate resin include terephthalic acid, isophthalic acid, phthalic acid, 2,5-naphthalene dicarboxylic acid, 2,6-naphthalene dicarboxylic acid, 2,7-naphthalene dicarboxylic acid, 1,5-naphthalene dicarboxylic acid, methyl terephthalic acid, 4,4'-biphenyl dicarboxylic acid, 2,2'-biphenyl dicarboxylic acid, 4,4'-biphenyl ether dicarboxylic acid, 4,4'-diphenylmethane dicarboxylic acid, 4,4'-diphenylsulfone dicarboxylic acid, 4,4'-diphenylisopropylidenedicarboxylic acid, 1,2-bis (4-carboxyphenoxy) ethane, and 5-sodium sulfoisophthalic acid. Among these, terephthalic acid and isophthalic acid are preferable, and from a point of view of melt processability and mechanical properties, it is more preferable that a mixture of both be used.

Examples of bisphenol that forms the bisphenol residue in the polyarylate resin include 2,2-bis(4-hydroxyphenyl) propane [bisphenol A], 2-phenyl-3,3-bis(4-hydroxyphenyl) phthalimidine, 4,4'-(3,3,5-trimethylcyclohexylidene) diphenol, 2,2-bis (4-hydroxy-3,5-dimethylphenyl) propane, 2,2-bis(4-hydroxy-3,5-dibromophenyl) propane, 2,2-bis(4-hydroxy-3,5-dichlorophenyl) propane, 4,4'-dihydroxydiphenylsulfone, 4,4'-dihydroxydiphenyl ether, 4,4'-dihydroxydiphenyl sulfide, 4,4'-dihydroxydiphenyl ketone, 4,4'-dihydroxydiphenylmethane, 1,1-bis (4-hydroxyphenyl) cyclohexane, and the like. These bisphenols may each be independently used, or two or more of these bisphenols may be used in combination. Among these, from a point of view of polymerizability and economic efficiency, it is preferable that 2,2-bis(4-hydroxyphenyl) propane be used. Further, among these, from a point of view of heat resistance, it is preferable that 2-phenyl-3,3-bis(4-hydroxyphenyl) phthalimidine and 4,4'-(3,3,5-trimethylcyclohexylidene) diphenol be used.

In the resin composition, as components other than the polycarbonate resin or the polyarylate resin, the flowability improver, and the antioxidants (the phosphite-based antioxidant and the hindered phenol-based antioxidant), any other components, for example, additives such as a reinforcing agent, a thickening agent, a release agent, a coupling agent, a flame retardant, a flameproofing agent, a pigment, a coloring agent, a light diffusing agent and other auxiliary agents, or a filler, can be added according to an intended purpose to an extent that the effects are not lost. An amount of these additives to be used is preferably in the range of 0-100 parts by weight in total with respect to 100 parts by weight of the resin composition obtained by adding the flowability improver to the polycarbonate resin or the polyarylate resin.

An amount of a flame retardant to be used is more preferably 7-80 parts by weight, even more preferably 10-60 parts by weight, and particularly preferably 12-40 parts by weight with respect to 100 parts by weight of the resin composition obtained by adding the flowability improver to the polycarbonate resin or the polyarylate resin. As flame retardants, various compounds are known, and, for example, various compounds are described in "Polymer Flame Retardation Technology and Applications" (pages 149-221) (published by CMC Publishing Co., Ltd.), and the like. However, flame retardants are not limited to these. Among these flame retardants, phosphorus-based flame retardants, halogen-based flame retardants and inorganic flame retardants can be preferably used.

Specific examples of the phosphorus-based flame retardants include phosphate ester, halogen-containing phosphate ester, condensed phosphate ester, polyphosphate, red phosphorus, and the like. These phosphorus-based flame retardants may each be independently used, or two or more of these phosphorus-based flame retardants may be used in combination.

Specific examples of the halogen-based flame retardants include brominated polystyrene, brominated polyphenylene ether, a brominated bisphenol type epoxy polymer, a brominated styrene maleic anhydride polymer, a brominated epoxy resin, a brominated phenoxy resin, decabromodiphenyl ether, decabromobiphenyl, brominated polycarbonate, perchlorocyclopentadecane, a brominated crosslinked aromatic polymer, and the like. Among these, brominated polystyrene and brominated polyphenylene ether are particularly preferable. These halogen-based flame retardants may each be independently used, or two or more of these halogen-based flame retardants may be used in combination. Further, halogen element content of these halogen-based flame retardants is preferably 15 to 87%.

With respect to the resin composition, in order to improve mechanical strength, dimensional stability, and the like, or for a purpose of achieving an increase in volume, an inorganic filler may be further added.

Examples of inorganic fillers include metal sulfate compounds such as zinc sulfate, potassium hydrogen sulfate, aluminum sulfate, antimony sulfate, sulfuric ester, potassium sulfate, cobalt sulfate, sodium hydrogen sulfate, iron sulfate, copper sulfate, sodium sulfate, nickel sulfate, barium sulfate, magnesium sulfate, and ammonium sulfate; titanium compounds such as titanium oxide; carbonate compounds such as potassium carbonate; metal hydroxide compounds such as aluminum hydroxide and magnesium hydroxide; silica type compounds such as synthetic silica and natural silica; calcium aluminate, dihydrate gypsum, zinc borate, barium metaborate, and borax; nitric acid compounds such as sodium nitrate, molybdenum compounds, zirconium compounds, antimony compounds and modified products thereof; composite fine particles of silicon dioxide and aluminum oxide, and the like.

Further, other examples of inorganic fillers include potassium titanate whiskers, mineral fibers (such as rock wool), glass fibers, carbon fibers, metal fibers (such as stainless steel fibers), aluminum borate whiskers, silicon nitride whiskers, boron fibers, tetrapod-like zinc oxide whiskers, talc, clay, kaolin clay, natural mica, synthetic mica, pearl mica, aluminum foil, alumina, glass flakes, glass beads, glass balloon, carbon black, graphite, calcium carbonate, calcium sulfate, calcium silicate, titanium oxide, zinc oxide, silica, asbestos, quartz powder, and the like.

These inorganic fillers may be untreated or may be subjected to a chemical or physical surface treatment in advance. Examples of a surface treatment agent used in the surface treatment include silane coupling agent-based, higher fatty acid-based, fatty acid metal salt-based, unsaturated organic acid-based, organic titanate-based, resin acid-based, and polyethylene glycol-based compounds and the like.

A method for manufacturing the resin composition is not particularly limited. The resin composition is manufactured using a commonly known method in which, for example, the flowability improver and the polycarbonate resin or the polyarylate resin, and, when necessary, additives such as a light diffusing agent, are blended and melt-kneaded using an apparatus such as a Henschel mixer, a Banbury mixer, a single screw extruder, a twin screw extruder, a two-roll mill, a kneader, or a Brabender. It is preferable that the melt-kneading temperature is as low as possible for a purpose of suppressing yellowing in the resin composition due to a transesterification reaction between the polyester contained in the flowability improver and the polycarbonate resin or the polyarylate resin or due to thermal deterioration or the like of the polycarbonate resin or the polyarylate resin.

By extrusion molding the resin composition in various ways, the resin composition can molded into, for example, various profile extrusion molded articles, extrusion molded sheets and films, and the like, as molded articles. In addition to a cold runner molding method and a hot runner molding method, examples of the various extrusion molding methods further include injection compression molding, injection press molding, gas-assisted injection molding, foam molding (including a case of injection of supercritical fluid), insert molding, in-mold coating molding, insulation mold molding, rapid heating/cooling mold molding, two color molding, sandwich molding, and injection molding method such as ultra high speed injection molding. Further, an inflation method, a calendar method, a casting method, or the like can be used for molding a sheet or a film. Further, by applying a specific stretching operation, the resin composition can also be molded into a heat shrinkable tube. Further, by molding the resin composition by rotational molding, blow molding or the like, a hollow molded article can also be formed.

The molded articles can be used for a wide range of applications such as various casings, hard coat products, a glazing material, a light diffusing plate, an optical disc substrate, a light guide plate, medical materials, and miscellaneous goods. Specifically, the molded articles, for example, can be used as exterior materials of OA equipment and household appliances, various containers, miscellaneous goods, exterior materials of, for example, personal computers, notebook computers, game machines, display devices (such as CRTs, liquid crystal displays, plasma displays, projectors, organic EL displays), mouses, and printers, copy machines, scanners and facsimiles (including multifunction machines of these), as resin products that are formed in keyboard keys, switch molded articles, mobile information terminals (so-called PDAs), mobile phones, mobile books (such as dictionaries), portable TVs, drives of recording media (such as CDs, MDs, DVDs, blue-ray discs, and hard disks), reading devices of recording media (such as IC cards, smart media, and memory sticks), optical cameras, digital cameras, parabolic antennas, power tools, VTRs, irons, hair dryers, rice cookers, microwave ovens, audio equipment, lighting equipment, refrigerators, air conditioners, air purifiers, negative ion generators, typewriters, and the like. Further, the molded articles are also useful for trays, cups, dishes, shampoo bottles, OA casings, cosmetic bottles, beverage bottles, oil containers, injection molded articles (such as golf tees, cores of cotton swabs, candy bars, brushes, toothbrushes, helmets, syringes, dishes, cups, combs, razor handles, tape cassettes and cases, disposable spoons and forks, stationery such as ballpoint pens), and the like.

Further, the molded articles can be used in various fields such as banding tapes (binding bands), prepaid cards, balloons, pantyhose, hair caps, sponges, scotch tapes, umbrellas, raincoats, plastic gloves, ropes, tubes, foam trays, foam cushioning materials, cushioning material, packing materials, and cigarette filters.

Further, the molded articles can be used in fields of vehicle parts such as lamp sockets, lamp reflectors, lamp housings, instrumental panels, center console panels, deflector parts, car navigation parts, car audio visual parts, auto mobile computer parts, and the like.

Further, embodiments of the present invention can also include a method for improving flowability of polycarbonate or polyarylate using the above-described flowability improver. In other words, embodiments of the present invention may include a method for improving flowability of polycarbonate or polyarylate that includes a process of mixing the above-described flowability improver and polycarbonate or polyarylate. In another aspect, use of the above-described flowability improver can be expressed as use for improving flowability of polycarbonate or polyarylate.

EXAMPLES

Next, the flowability improver and the resin composition are further described in detail using manufacturing examples, examples and comparative examples. However, the present invention is not limited to such examples only. Unless otherwise specified, reagents used below were reagents manufactured by Wako Pure Chemical Industries, Ltd., which were used without further purification.

<Evaluation Method>

[Method for Measuring Number Average Molecular Weight]

A sample solution was prepared by dissolving the polyester contained in the flowability improver in a mixed solvent of p-chlorophenol (manufactured by Tokyo Chemical Industry Co., Ltd.) and toluene at a volume ratio of 3:8 such that concentration of the solution became 0.25 weight %. Polystyrene was used as a standard substance, and a similar sample solution was prepared. Then, measurement was performed using a high temperature GPC (350 HT-GPC System manufactured by Viscotek Co.) at a column temperature of 80° C. and a flow rate of 1.00 mL/minute. A differential refractometer (RI) was used as a detector.

Method for Measuring Flowability

Spiral flow (mm) of the resin composition was evaluated using an injection molding machine (IS-100, manufactured by Toshiba Machine Co., Ltd.). For the polycarbonate resin composition, molding temperature was 310° C., mold temperature was 80° C., and injection pressure was 100 MPa. For the polyarylate resin composition, molding temperature was 320° C., mold temperature was 100° C., and injection pressure was 120 MPa. Molded articles each had a thickness of 1 mm and a width of 10 mm.

Method for Measuring Charpy Impact Strength

According to ISO 179, a notched test specimen of the resin composition was prepared and Charpy impact strength ($kJ/m^2$) of the test specimen was measured.

Method for Measuring Total Light Transmittance and Haze

A test specimen of 4 cm long×4 cm wide×4 mm thick was prepared by injection molding, and total light transmittance (%) and haze (%) of the resin composition were measured using a haze meter ("ND-1001 DP" manufactured by Nippon Denshoku Industries Co., Ltd.).

Method for Measuring Initial Yellowness Index (YI)

A test specimen of 4 cm long×4 cm wide×4 mm thick was prepared by injection molding, and an initial yellowing index (YI) of the resin composition was measured using a spectroscopic colorimeter SE-2000 (manufactured by Nippon Denshoku Industries Co., Ltd.).

Method for Measuring Flexural Modulus and Flexural Strength

In order to evaluate mechanical properties, flexural modulus (MPa) and flexural strength (MPa) of the resin composition were measured according to JIS K7171 (measurement temperature: 23° C.; dimensions of a bending test specimen: 80 mm length×10 mm width×4 mm thickness) using AUTOGRAPH AG-I (manufactured by Shimadzu Corporation).

Method for Measuring Deflection Temperature Under Load

In order to evaluate heat resistance, load deflection temperature (° C.) of the resin composition was measured according to JIS K7191 (test condition: load 1.8 MPa; rate of temperature increase: 120° C./hour) using HOT TESTER S-3 (manufactured by Toyo Seiki Seisakusho Co., Ltd.).

<Materials Used>

Resins (A-1) Polycarbonate, Taflon A2200 (manufactured by Idemitsu Kosan Co., Ltd.)

(A-2) Polycarbonate, Taflon A1900 (manufactured by Idemitsu Kosan Co., Ltd.)

(A-3) Polycarbonate, Taflon A1700 (manufactured by Idemitsu Kosan Co., Ltd.)

(A-4) Polyarylate, U polymer U-100 (manufactured by Unitika Ltd.)

Antioxidant (B-1) Phosphite-based antioxidant: PEP36 (manufactured by Adeka Corporation)

(B-2) Phosphite-based antioxidant: 2112 (manufactured by Adeka Corporation)

(B-3) phosphite-based antioxidant: Irgafos126 (manufactured by BASF Japan Ltd.)

(B-4) Hindered phenol-based antioxidant: AO60 (manufactured by Adeka Corporation)

Flowability Improver

Example 1

4,4'-dihydroxybiphenyl, bisphenol A and sebacic acid were put at molar ratios of 25:25:50 in a sealed reactor equipped with a reflux condenser, a thermometer, a nitrogen gas inlet tube and a stirring bar, and acetic anhydride in an amount of 1.04 equivalents with respect to phenolic hydroxyl groups in the monomers was added and sodium acetate in an amount of 0.001 mass % with respect to yield of polyester was added as a polymerization catalyst. After a homogeneous solution was obtained by causing the monomers to react under a normal pressure in a nitrogen gas atmosphere at a temperature of 145° C., while generated acetic acid was distilled off, the temperature was raised to 250° C. at a rate of 2° C./minute, and the solution was stirred at 250° C. for one hour. Subsequently, while the temperature was maintained, the pressure was reduced to 5 Torr over about 60 minutes, and the reduced pressure state was maintained. After 1.5 hours from the start of the pressure reduction, interior of the sealed reactor was returned to state of a normal pressure in a nitrogen gas. The antioxidants (B-1) and (B-4) each in an amount of 0.2 mass % with respect to a mass of generated polyester were added and the resulting solution was stirred for five minutes, and thus a flowability improver was obtained. Thereafter, the flowability improver was taken out from the reactor. The obtained polyester had a number average molecular weight of 12,000. The obtained polyester is referred to as (C-1).

In order to evaluate performance of the flowability improver, a resin, antioxidants, and the polyester obtained in Example 1 were blended at ratios (parts by weight) shown in Table 1, and the resulting mixture was supplied to a twin-screw extruder and was melt-kneaded at an extrusion temperature shown in Table 1 to obtain a resin composition. Then, by measuring physical properties of the resin composition, the performance of the flowability improver was evaluated. Various physical properties of the resin composition are shown in Table 3.

Examples 2 and 3

Polyesters were obtained in the same manner as in Example 1 except that the time period from the start of the pressure reduction to when the flowability improver was taken out was 1.7 hours in Example 2 and 2 hours in Example 3. The obtained polyesters respectively had number average molecular weights of 17,000 and 27,000. The obtained polyesters are respectively referred to as (C-2) and (C-3). Further, in the same manner as in Example 1, for each of Examples 2 and 3, a resin, antioxidants, and the obtained polyester were blended at ratios (parts by weight) shown in Table 1, and the resulting mixture was supplied to a twin-screw extruder and was melt-kneaded at an extrusion temperature shown in Table 1 to obtain a resin composition. Then, by measuring physical properties of each of the resin compositions, performance of each of the flowability improvers was evaluated. Various physical properties of the resin compositions are shown in Table 3.

Example 4

4,4'-dihydroxybiphenyl, bisphenol A and sebacic acid were put at molar ratios of 24:24:52 in a sealed reactor equipped with a reflux condenser, a thermometer, a nitrogen gas inlet tube and a stirring bar, and further, 4-t-butylphenol as a terminal capping agent in an amount of 6.7 mol % with respect to a total amount of the monomers was added, and acetic anhydride in an amount of 1.03 equivalents with respect to phenolic hydroxyl groups in the monomers was added and sodium acetate in an amount of 0.001 mass % with respect to yield of polyester was added as a polymerization catalyst. After a homogeneous solution was obtained by causing the monomers to react under a normal pressure in a nitrogen gas atmosphere at a temperature of 145° C., while generated acetic acid was distilled off, the temperature was raised to 260° C. at a rate of 2° C./minute, and the solution was stirred at 240° C. for one hour. Subsequently, while the temperature was maintained, the pressure was reduced to 5 Torr over about 60 minutes, and the reduced pressure state was maintained. After 3 hours from the start of the pressure reduction, interior of the sealed reactor was returned to a state of a normal pressure in a nitrogen gas. The antioxidants (B-1) and (B-4) each in an amount of 0.2 mass % with respect to a mass of generated polyester were added and the resulting solution was stirred for five minutes, and thus a flowability improver was obtained. Thereafter, the flowability improver was taken out from the reactor. The obtained polyester had a number average molecular weight of 11,000 and a terminal capping ratio of 70%. The obtained polyester is referred to as (C-4). Further, in the same manner as in Example 1, a resin, antioxidants, and the obtained polyester were blended at ratios (parts by weight) shown in Table 1, and the resulting mixture was supplied to a twin-screw extruder and was melt-kneaded at an extrusion temperature shown in Table 1 to obtain a resin composition. Then, by measuring physical properties of the resin composition, the performance of the flowability improver was evaluated. Various physical properties of the resin composition are shown in Table 3.

Example 5

4,4'-dihydroxybiphenyl, bisphenol A, sebacic acid and tetradecanedioic acid were put at molar ratios of 45:5:37.5:12.5 in a sealed reactor equipped with a reflux condenser, a thermometer, a nitrogen gas inlet tube and a stirring bar, and acetic anhydride in an amount of 1.04 equivalents with respect to phenolic hydroxyl groups in the monomers was added and sodium acetate in an amount of 0.001 mass % with respect to yield of polyester was added as a polymerization catalyst. After a homogeneous solution was obtained by causing the monomers to react under a normal pressure in a nitrogen gas atmosphere at a temperature of 145° C., while generated acetic acid was distilled off, the temperature was raised to 250° C. at a rate of 2° C./minute, and the solution was stirred at 250° C. for one hour. Subsequently, while the temperature was maintained, the pressure was reduced to 5 Torr over about 60 minutes, and the reduced pressure state was maintained. After 1.7 hours from the start of the pressure reduction, interior of the sealed reactor was returned to a state of a normal pressure in a nitrogen gas, and the polyester was taken out from the reactor. The obtained polyester had a number average molecular weight of 17,000. The obtained polyester is referred to as (C-5). Further, in the same manner as in Example 1, a resin, antioxidants, and the obtained polyester were blended at ratios (parts by weight) shown in Table 1, and the resulting mixture was supplied to a twin-screw extruder and was melt-kneaded at an extrusion temperature shown in Table 1 to obtain a resin composition. Then, by measuring physical properties of the resin composition, the performance of the flowability improver was evaluated. Various physical properties of the resin composition are shown in Table 3.

Example 6

Polyester was obtained in the same manner as in Example 1 except that, as monomers, bisphenol A and sebacic acid were put at a molar ratio of 50:50. The obtained polyester had a number average molecular weight of 17,000. The obtained polyester is referred to as (C-6). Further, in the same manner as in Example 1, a resin, antioxidants, and the obtained polyester were blended at ratios (parts by weight) shown in Table 1, and the resulting mixture was supplied to a twin-screw extruder and was melt-kneaded at an extrusion temperature shown in Table 1 to obtain a resin composition. Then, by measuring physical properties of the resin composition, the performance of the flowability improver was evaluated. Various physical properties of the resin composition are shown in Table 3.

Comparative Example 1

Polyester was obtained in the same manner as in Example 1 except that, as monomers, 4,4'-dihydroxybiphenyl, sebacic acid and tetradecanedioic acid were put at molar ratios of 50:37.5:12.5. The obtained polyester had a number average molecular weight of 17,000. The obtained polyester is referred to as (C-8). Further, in the same manner as in Example 1, a resin, antioxidants, and the obtained polyester were blended at ratios (parts by weight) shown in Table 1, and the resulting mixture was supplied to a twin-screw extruder and was melt-kneaded at an extrusion temperature shown in Table 1 to obtain a resin composition. Then, by measuring physical properties of the resin composition, the performance of the flowability improver was evaluated. Various physical properties of the resin composition are shown in Table 3.

Examples 7-10, Comparative Examples 2-5, and Reference Example

Resin compositions were each obtained by blending a resin, antioxidants and polyester at ratios (parts by weight) shown in Table 1 or 2, supplying the resulting mixture to a twin-screw extruder, and melt-kneeding the mixture at an extrusion temperature shown in Table 1 or 2. Then, by measuring physical properties of each of the resin compositions, performance of each of the flowability improvers was evaluated. Various physical properties of the resin compositions are shown in Tables 3 and 4.

Example 11

Polyester was obtained in the same manner as in Example 1 except that, as monomers, 4,4'-dihydroxybiphenyl, bisphenol A and sebacic acid were put at molar ratios of 30:20:50, sodium acetate, which is a polymerization catalyst, was not used, and the time period from the start of the pressure reduction to when the interior of the sealed reactor was returned to a state of a normal pressure in a nitrogen gas was 3 hours. The obtained polyester had a number average molecular weight of 11, 300. The obtained polyester is referred to as (C-7). Further, in the same manner as in Example 1, a resin, antioxidants, and the obtained polyester were blended at ratios (parts by weight) shown in Table 2, and the resulting mixture was supplied to a twin-screw extruder and was melt-kneaded at an extrusion temperature shown in Table 2 to obtain a resin composition. Then, by measuring physical properties of the resin composition, the performance of the flowability improver was evaluated. Various physical properties of the resin composition are shown in Table 4.

TABLE 1

|  |  | Example | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| Resin (parts by weight) | (A-1) | 97 | 97 | 97 | 97 | 97 |  | 97 | 100 |  |  |
|  | (A-2) |  |  |  |  |  | 97 |  |  | 100 |  |
|  | (A-3) |  |  |  |  |  |  |  |  |  | 100 |
| Antioxidant (parts by weight) | (B-1) | 0.2 | 0.2 | 0.2 |  |  | 0.2 | 0.2 | 0.2 | 0.2 | 0.2 |
|  | (B-2) |  |  |  |  | 0.2 |  | 0.2 |  |  |  |
|  | (B-3) |  |  |  | 0.2 |  |  |  |  |  |  |
|  | (B-4) | 0.2 | 0.2 | 0.2 | 0.2 | 0.2 | 0.2 | 0.2 | 0.2 | 0.2 | 0.2 |
| Obtained polyester (parts by weight) | (C-1) | 3 |  |  |  |  |  |  |  |  |  |
|  | (C-2) |  | 3 |  |  |  |  |  |  |  |  |
|  | (C-3) |  |  | 3 |  |  |  |  |  |  |  |
|  | (C-4) |  |  |  | 3 |  |  |  |  |  |  |
|  | (C-5) |  |  |  |  | 3 |  |  |  |  |  |
|  | (C-6) |  |  |  |  |  | 3 |  |  |  |  |
|  | (C-8) |  |  |  |  |  |  | 3 |  |  |  |
| Extrusion temperature (° C.) |  | 260 | 260 | 280 | 260 | 260 | 260 | 260 | 260 | 260 | 260 |

TABLE 2

|  |  | Example | | | Reference Example | Example | | Comparative Example |
| --- | --- | --- | --- | --- | --- | --- | --- | --- |
|  |  | 7 | 8 | 9 |  | 10 | 11 | 5 |
| Resin (parts by weight) | (A-1) | 99 | 95 | 90 | 70 | 95 |  |  |
|  | (A-4) |  |  |  |  |  | 97 | 100 |
| Antioxidant (parts by weight) | (B-1) | 0.2 | 0.5 | 0.5 | 0.5 | 0.2 | 0.2 | 0.2 |
|  | (B-4) | 0.2 | 0.5 | 0.5 | 0.5 | 0.2 | 0.2 | 0.2 |
| Obtained polyester (parts by weight) | (C-1) | 1 | 5 | 10 | 30 |  |  |  |
|  | (C-4) |  |  |  |  | 5 |  |  |
|  | (C-7) |  |  |  |  |  | 3 |  |
| Extrusion temperature (° C.) |  | 260 | 260 | 260 | 260 | 260 | 300 | 300 |

TABLE 3

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Spiral Flow (mm) | 135 | 125 | 115 | 135 | 125 | 132 | 125 | 105 | 120 | 140 |
| Load Deflection Temperature (° C.) | 124.5 | 125.9 | 125.7 | 124.3 | 125.5 | 126.1 | 125.9 | 129.2 | 128.8 | 126.7 |
| Flexural Strength (MPa) | 93.5 | 94.7 | 92.5 | 93.3 | 93.1 | 94.9 | 94.7 | 91.8 | 93.2 | 92.9 |
| Flexural Modulus (MPa) | 2140 | 2330 | 2319 | 2205 | 2320 | 2399 | 2330 | 2078 | 2233 | 2226 |
| Charpy Impact Strength (kJ/m$^2$) | 68.2 | 73.2 | 71.9 | 69.1 | 74.2 | 66.5 | 75.2 | 67.6 | 66.1 | 39.1 |
| Haze (%) | 0.7 | 0.6 | 0.7 | 0.7 | 0.6 | 0.7 | 6.2 | 0.6 | 0.8 | 0.8 |
| Total Light Transmittance (%) | 89.7 | 89.1 | 89.2 | 89.6 | 89.2 | 89.5 | 89.1 | 89.2 | 89.5 | 90.3 |
| YI (—) | 3.7 | 3.8 | 4.0 | 3.8 | 5.8 | 3.9 | 6.1 | 3.0 | 3.0 | 2.8 |

TABLE 4

|  | Example | | | Reference Example | Example | | Comparative Example |
|---|---|---|---|---|---|---|---|
|  | 7 | 8 | 9 |  | 10 | 11 | 5 |
| Spiral Flow (mm) | 125 | 155 | 175 | 200 | 150 | 85 | 70 |
| Load Deflection Temperature (° C.) | 126.8 | 121.3 | 116.7 | 91.1 | 122.2 | 152.2 | 159.7 |
| Flexural Strength (MPa) | 94.2 | 91.7 | 91.4 | 77.1 | 95.3 | 93.1 | 89.9 |
| Flexural Modulus (MPa) | 2340 | 2154 | 2243 | 1952 | 2219 | 2134 | 2158 |
| Charpy Impact Strength (kJ/m$^2$) | 67.0 | 58.7 | 72.5 | 68.3 | 60.0 | 22.5 | 22.0 |
| Haze (%) | 0.8 | 0.7 | 0.7 | 0.8 | 0.7 | 0.9 | 0.9 |
| Total Light Transmittance (%) | 89.1 | 89.9 | 88.5 | 88.7 | 89.9 | 86.7 | 85.7 |
| YI (—) | 3.2 | 4.2 | 4.5 | 8.2 | 4.1 | 12.2 | 9.15 |

From the comparison Examples 1-5, 7-10 and Comparative Example 2, the comparison between Example 6 and Comparative Example 3, and the comparison between Example 11 and Comparative Example 5, it is clear that flowability (spiral flow) of the resin can be improved by adding the flowability improver without ruining the flexural modulus, the flexural strength, the impact strength, and the transparency. From the comparison between Example 5 and Comparative Example 1, it is clear that shows that, when the flowability improver does not contain the bisphenol A component, the haze of the resin composition tends to increase. This is because the compatibility of the flowability improver with the polycarbonate resin is low and phase separation occurs. In the reference example, since the resin composition contains 30 mass % of the flowability improver, the load deflection temperature is significantly lowered. In Example 5, the flowability improver did not contain an antioxidant in advance and thus the YI of the resin composition was slightly higher as compared to Examples 1-4. From this, it is clear that it is more preferable that the flowability improver contain an appropriate amount of an antioxidant in advance. In Example 10, it is clear that, since terminal groups of the polyester are capped, yellowing of the resin composition is more suppressed, and an equivalent YI can be obtained even when the amount of the antioxidant is smaller than the amount of the antioxidant used in Example 8 during melt-kneading with the polycarbonate resin. Further, from the comparison between Example 11 and Comparative Example 5, it is clear that, similar to the case of the polycarbonate resin, by adding the flowability improver to the polyarylate resin, the flowability of the resin can be improved without ruining the inherent properties of the resin.

An aspect of the present invention is to provide a flowability improver for improving flowability during a molding process without ruining inherent properties (transparency, impact resistance, high rigidity, mechanical strength, surface layer peeling resistance, heat resistance, chemical resistance, and the like) of a polycarbonate resin and a polyarylate resin, a high-flowability polycarbonate resin composition and a polyarylate resin composition that contain the flowability improver, and a molded article thereof.

The present inventors found that flowability during a molding process can be improved without ruining inherent useful properties (especially transparency and impact strength) of a polycarbonate resin or a polyarylate resin by using a flowability improver as a component improving the flowability of the polycarbonate resin or the polyarylate resin and by melt-kneading the flowability improver and the polycarbonate resin or the polyarylate resin, the flowability improver containing polyester obtained by polycondensing a bisphenol component and an aliphatic dicarboxylic acid component, and, optionally, a biphenol component at specific ratios. The present invention includes the following 1)-11) aspects.

1) A flowability improver for polycarbonate and polyarylate includes polyester obtained by polycondensing monomers including: a bisphenol component (B) represented by the following general formula (2)

Chemical Formula 1

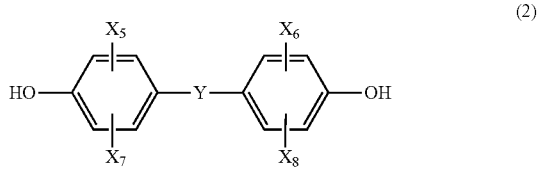

(2)

(where $X_5$-$X_8$ may be the same or different and each represent a hydrogen atom, a halogen atom, or an alkyl group with 1-4 carbons; and Y represents a methylene group, an isopropylidene group, a cyclic alkylidene group, an aryl-substituted alkylidene group, an arylenedialkylidene group, —S—, —O—, a carbonyl group or —SO$_2$—); and a dicarboxylic acid component (C) represented by the following general formula (3)

HOOC—R$_1$—COOH     (3)

(where R$_1$ represents a divalent straight-chain substituent that has 2-18 main-chain atoms and may include a branch). A molar ratio of the component (B) to the component (C) is (B):(C)=45:55-55:45, and a content rate of a portion derived from the component (B) and the component (C) in the polyester is 50 mol % or more.

2) A flowability improver for polycarbonate and polyarylate includes polyester obtained by polycondensing monomers including: a biphenol component (A) represented by the following general formula (1)

Chemical Formula 2

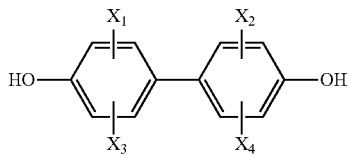
(1)

(where $X_1$-$X_4$ may be the same or different and each represent a hydrogen atom, a halogen atom, or an alkyl group with 1-4 carbons); a bisphenol component (B) represented by the following general formula (2)

[Chemical Formula 3]

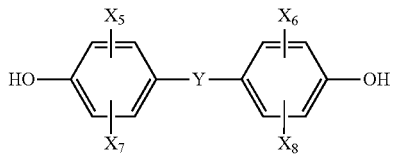
(2)

(where $X_5$-$X_8$ may be the same or different and each represent a hydrogen atom, a halogen atom, or an alkyl group with 1-4 carbons; and Y represents a methylene group, an isopropylidene group, a cyclic alkylidene group, an aryl-substituted alkylidene group, an arylenedialkylidene group, —S—, —O—, a carbonyl group or —SO$_2$—); and a dicarboxylic acid component (C) represented by the following general formula (3)

HOOC—R$_1$—COOH (3)

(where R$_1$ represents a divalent straight-chain substituent that has 2-18 main-chain atoms and may include a branch). A molar ratio of the component (A) and the component (B) to the component (C) is {(A)+(B)}:(C)=45:55-55:45, and a content rate of a portion derived from the component (A), the component (B) and the component (C) in the polyester is 50 mol % or more.

3) A flowability improver for polycarbonate and polyarylate includes polyester obtained by polycondensing a biphenol component (A) represented by the following general formula (1)

Chemical Formula 4

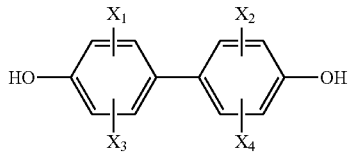
(1)

(where $X_1$-$X_4$ may be the same or different and represent a hydrogen atom, a halogen atom, or an alkyl group with 1-4 carbons); a bisphenol component (B) represented by the following general formula (2)

Chemical Formula 5

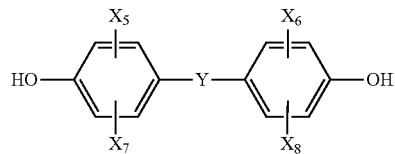
(2)

(where $X_5$-$X_8$ may be the same or different and each represent a hydrogen atom, a halogen atom, or an alkyl group with 1-4 carbons; and Y represents a methylene group, an isopropylidene group, a cyclic alkylidene group, an aryl-substituted alkylidene group, an arylenedialkylidene group, —S—, —O—, a carbonyl group or —SO$_2$—); a dicarboxylic acid component (C) represented by the following general formula (3)

HOOC—R$_1$—COOH (3)

(where R$_1$ represents a divalent straight-chain substituent that has 2-18 main-chain atoms and may include a branch); and a dicarboxylic acid component (D) represented by the following general formula (4)

HOOC—R$_2$—COOH (4)

(where R$_2$ represents a divalent straight-chain substituent that has 4-20 main-chain atoms and may include a branch, and has a larger number of main-chain atoms than that of R$_1$). A molar ratio of the component (A) and the component (B) to the component (C) and the component (D) is {(A)+(B)}:{(C)+(D)}=45:55-55:45, and a content rate of a portion derived from the component (A), the component (B), the component (C) and the component (D) in the polyester is 50 mol % or more.

4) The flowability improver described in any one of the aspects 1)-3) further includes a phosphite-based antioxidant, and a content of the phosphite-based antioxidant contained in the flowability improver is 0.005-5 weight % with respect to a weight of the polyester contained in the flowability improver.

5) The flowability improver described in aspect 4) further includes a hindered phenol-based antioxidant, and a content of the hindered phenol-based antioxidant contained in the flowability improver is 0.005-5 weight % with respect to weight of the polyester contained in the flowability improver.

6) In the flowability improver described in any one of the aspects 1)-5), a number average molecular weight of the polyester is 10000-30000.

7) In the flowability improver described in any one of the aspects 1)-6), a portion corresponding to R$_1$ of a portion formed from the component (C) in the polyester is a linear saturated aliphatic hydrocarbon chain, and, when a portion formed from the component (D) is contained in the polyester, a portion corresponding to R$_2$ of the portion formed from the component (D) in the polyester is a linear saturated aliphatic hydrocarbon chain.

8) In the flowability improver described in any one of the aspects 1)-7), a portion corresponding to R$_1$ of a portion formed from the component (C) in the polyester has an even number of main-chain atoms, and, when a portion formed from the component (D) is contained in the polyester, a portion corresponding to R$_2$ of the portion formed from the component (D) in the polyester has an even number of main-chain atoms.

9) In the flowability improver described in any one of the aspects 1)-8), terminal groups of the polyester are capped by a monofunctional low molecular weight compound, and a capping rate thereof is 60% or more.

10) A resin composition includes 80-99.9 weight % of a polycarbonate resin or a polyarylate resin, and 0.1-20 weight % of the flowability improver described in any one of the aspects 1)-9).

11) A molded article obtained by molding the resin composition described in the aspect 10).

12) A method for improving flowability of polycarbonate or polyarylate includes a process of mixing a flowability improver and the polycarbonate or the polyarylate. The flowability improver contains polyester obtaining by polycondensing monomers including: a bisphenol component (B) represented by the following general formula (2)

Chemical Formula 6

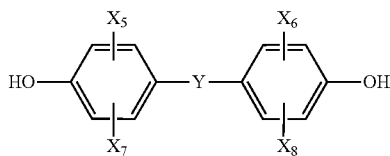

(2)

(where $X_5$-$X_8$ may be the same or different and each represent a hydrogen atom, a halogen atom, or an alkyl group with 1-4 carbons; and Y represents a methylene group, an isopropylidene group, a cyclic alkylidene group, an aryl-substituted alkylidene group, an arylenedialkylidene group, —S—, —O—, a carbonyl group or —SO$_2$—); and a dicarboxylic acid component (C) represented by the following general formula (3)

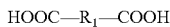 HOOC—R$_1$—COOH (3)

(where $R_1$ represents a divalent straight-chain substituent that has 2-18 main-chain atoms and may include a branch). A molar ratio of the component (B) to the component (C) is (B):(C)=45:55-55:45, and a content rate of a portion derived from the component (B) and the component (C) in the polyester is 50 mol % or more.

The flowability improver can improve flowability of a polycarbonate resin or a polyarylate resin during a molding process without ruining inherent properties (transparency, impact resistance, high rigidity, mechanical strength, surface layer peeling resistance, heat resistance, chemical resistance, and the like) of the resins.

Further, the method for improving flowability of polycarbonate or polyarylate can improve flowability of the polycarbonate or the polyarylate without ruining inherent properties (transparency, impact resistance, high rigidity, mechanical strength, surface layer peeling resistance, heat resistance, chemical resistance, and the like) of the polycarbonate and the polyarylate.

According to the resin composition obtained by adding the flowability improver to the polycarbonate resin or the polyarylate resin, flowability during a molding process is good, and a good molded article can be obtained and has excellent performance, for example, as a hard coat product, a glazing material, a light diffusion plate, an optical disc substrate, a light guide plate and the like.

The molded article has the inherent properties of the polycarbonate resin and the polyarylate resin and is useful, for example, as a hard coat article, a glazing material, a light diffusion plate, an optical disc substrate, a light guide plate, and the like.

INDUSTRIAL APPLICABILITY

The flowability improver can improve the flowability of the polycarbonate resin or the polyarylate resin during a molding process without ruining inherent properties (transparency, impact resistance, high rigidity, mechanical strength, surface layer peeling resistance, heat resistance, chemical resistance, and the like) of the resins. Therefore, the polycarbonate resin composition and the polyarylate resin composition allow molding of a molded article that has become larger, thinner and more complicated in shape to be realized, and can be suitably used for a wide range of applications such as hard coat products, glazing materials, light diffusion plates, optical disc substrates, light guide plates, medical materials, and miscellaneous goods.

Obviously, numerous modifications and variations of the present invention are possible in light of the above teachings. It is therefore to be understood that within the scope of the appended claims, the invention may be practiced otherwise than as specifically described herein.

What is claimed is:

1. A method of improving flowability of polycarbonate or polyarylate, comprising:

mixing the polycarbonate or the polyarylate with a flowability improver comprising a polyester, wherein the polyester is a polycondensate of monomers including a biphenol component (A), a bisphenol component (B), and a dicarboxylic acid component (C) at a molar ratio satisfying {(A)+(B)}:(C)=45:55-55:45, where a molar ratio of the biphenol component (A) to the bisphenol component (B) is 1/9 to 9/1, the polyester includes a portion derived from the biphenol component (A), the bisphenol component (B) and the dicarboxylic acid component (C) in an amount of 50 mol % or more, the biphenol component (A) has formula (1)

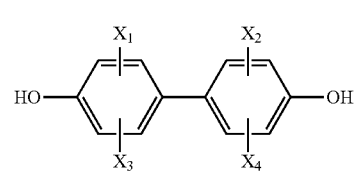

(1)

where $X_1$-$X_4$ may be the same or different and each represent a hydrogen atom, a halogen atom, or an alkyl group with 1-4 carbons, the bisphenol component (B) has formula (2)

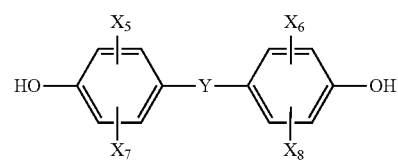

(2)

where $X_5$-$X_8$ may be the same or different and each represent a hydrogen atom, a halogen atom, or an alkyl group with 1-4 carbons, and Y represents a methylene group, an isopropylidene group, a cyclic alkylidene group, an aryl-substituted alkylidene group, an arylenedialkylidene group, —S—, —O—, a carbonyl group or —SO$_2$—, and the dicarboxylic acid component (C) has formula (3)

HOOC—R$_1$—COOH (3)

where R$_1$ represents a divalent straight-chain substituent that has 2-18 main-chain atoms and may include a branch.

2. The method of claim 1, wherein the flowability improver further includes a phosphite-based antioxidant in an amount of 0.005-5 weight % with respect to a weight of the polyester.

3. The method of claim 1, wherein the flowability improver further includes a hindered phenol-based antioxidant in an amount of 0.005-5 weight % with respect to the weight of the polyester.

4. The method of claim 1, wherein the polyester has a number average molecular weight of 10000-30000.

5. The method of claim 1, wherein the polyester includes a linear saturated aliphatic hydrocarbon chain in a portion corresponding to R$_1$ of a portion formed from the dicarboxylic acid component (C).

6. The method of claim 1, wherein the polyester has a terminal group capped by a monofunctional low molecular weight compound at a capping rate of 60% or more, and the monofunctional low molecular weight compound is at least one selected from the group consisting of phenol, p-cresol, p-t-butylphenol, p-t-octylphenol, p-cumyl phenol, p-nonylphenol, p-t-amylphenol, 4-hydroxybiphenyl, acetic acid, propionic acid, butyric acid, valeric acid, caproic acid, caprylic acid, lauric acid, tridecanoic acid, myristic acid, palmitic acid, stearic acid, pivalic acid, isobutyric acid, methylamine, ethylamine, propyl amine, butylamine, hexylamine, octylamine, decylamine, stearylamine, dimethyl amine, diethylamine, dipropylamine, and dibutylamine.

7. A flowability improver, comprising:

a polyester which is a polycondensate of monomers including a biphenol component (A), a bisphenol component (B), and a dicarboxylic acid component (C) at a molar ratio satisfying {(A)+(B)}:(C)=45:55-55:45, where a molar ratio of the biphenol component (A) to the bisphenol component (B) is 1/9 to 9/1, wherein the polyester includes a portion derived from the biphenol component (A), the bisphenol component (B) and the dicarboxylic acid component (C) in an amount of 50 mol % or more, the polyester has a terminal group capped by a monofunctional low molecular weight compound at a capping rate of 60% or more, the biphenol component (A) has formula (1)

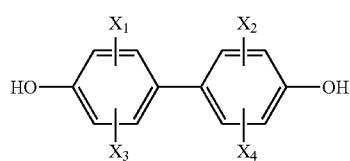

(1)

where X$_1$-X$_4$ may be the same or different and each represent a hydrogen atom, a halogen atom, or an alkyl group with 1-4 carbons, the bisphenol component (B) has formula (2)

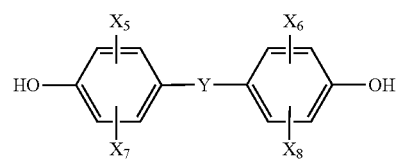

(2)

where X$_5$-X$_8$ may be the same or different and each represent a hydrogen atom, a halogen atom, or an alkyl group with 1-4 carbons, and Y represents a methylene group, an isopropylidene group, a cyclic alkylidene group, an aryl-substituted alkylidene group, an arylenedialkylidene group, —S—, —O—, a carbonyl group or —SO$_2$—, the dicarboxylic acid component (C) has formula (3)

HOOC—R$_1$—COOH (3)

where R$_1$ represents a divalent straight-chain substituent that has 2-18 main-chain atoms and may include a branch, and the monofunctional low molecular weight compound is at least one selected from the group consisting of phenol, p-cresol, p-t-butylphenol, p-t-octylphenol, p-cumyl phenol, p-nonylphenol, p-t-amylphenol, 4-hydroxybiphenyl, acetic acid, propionic acid, butyric acid, valeric acid, caproic acid, caprylic acid, lauric acid, tridecanoic acid, myristic acid, palmitic acid, stearic acid, pivalic acid, isobutyric acid, methylamine, ethylamine, propyl amine, butylamine, hexylamine, octylamine, decylamine, stearylamine, dimethyl amine, diethylamine, dipropylamine, and dibutylamine.

8. The flowability improver of claim 7, further comprising:

a phosphite-based antioxidant in an amount of 0.005-5 weight % with respect to a weight of the polyester.

9. The flowability improver of claim 8, further comprising:

a hindered phenol-based antioxidant in an amount of 0.005-5 weight % with respect to the weight of the polyester.

10. The flowability improver of claim 7, wherein the polyester has a number average molecular weight of 10000-30000.

11. The flowability improver of claim 7, wherein the polyester includes a linear saturated aliphatic hydrocarbon chain in a portion corresponding to R$_1$ of a portion formed from the dicarboxylic acid component (C).

12. A flowability improver, comprising:

a polyester which is a polycondensate of monomers including a biphenol component (A), a bisphenol component (B), a dicarboxylic acid component (C), and a dicarboxylic acid component (D) at a molar ratio satisfying {(A)+(B)}:{(C)+(D)}=45:55-55:45, where a molar ratio of the biphenol component (A) to the bisphenol component (B) is 1/9 to 9/1, wherein the polyester includes a portion derived from the component (A), the component (B), the component (C), and the component (D) in an amount of 50 mol % or more, the polyester has a terminal group capped by a monofunctional low molecular weight compound at a capping rate of 60% or more, the biphenol component (A) has formula (1)

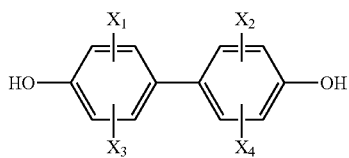

where $X_1$-$X_4$ may be the same or different and each represent a hydrogen atom, a halogen atom, or an alkyl group with 1-4 carbons,
the bisphenol component (B) has formula (2)

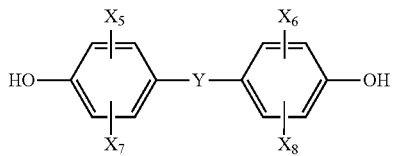

where $X_5$-$X_8$ may be the same or different and each represent a hydrogen atom, a halogen atom, or an alkyl group with 1-4 carbons, and
Y represents a methylene group, an isopropylidene group, a cyclic alkylidene group, an aryl-substituted alkylidene group, an arylenedialkylidene group, —S—, —O—, a carbonyl group or —SO$_2$—,
the dicarboxylic acid component (C) has formula (3)

HOOC—R$_1$—COOH   (3)

where R$_1$ represents a divalent straight-chain substituent that has 2-18 main-chain atoms and may include a branch,
the dicarboxylic acid component (D) has formula (4)

HOOC—R$_2$—COOH   (4)

where R$_2$ represents a divalent straight-chain substituent that has 4-20 main-chain atoms and may include a branch, and has a larger number of main-chain atoms than that of R$_1$, and
the monofunctional low molecular weight compound is at least one selected from the group consisting of phenol, p-cresol, p-t-butylphenol, p-t-octylphenol, p-cumyl phenol, p-nonylphenol, p-t-amylphenol, 4-hydroxybiphenyl, acetic acid, propionic acid, butyric acid, valeric acid, caproic acid, caprylic acid, lauric acid, tridecanoic acid, myristic acid, palmitic acid, stearic acid, pivalic acid, isobutyric acid, methylamine, ethylamine, propyl amine, butylamine, hexylamine, octylamine, decylamine, stearylamine, dimethyl amine, diethylamine, dipropylamine, and dibutylamine.

13. A resin composition, comprising:
80-99.9 weight % of a polycarbonate resin or a polyarylate resin; and
0.1-20 weight % of the flowability improver of claim 12.

14. The resin composition of claim 13, wherein the flowability improver further includes at least one phosphite-based antioxidant selected from the group consisting of 3,9-bis(2,6-di-tert-butyl-4-methylphenoxy)-2,4,8,10-tetraoxa-3,9-diphosphaspiro[5.5]undecane, 2,2'-methylenebis (4,6-di-tert-butylphenyl) 2-ethylhexyl phosphite, tris(2,4-di-tert-butylphenyl) phosphite, and bis(2,4-di-tert-butylphenyl) pentaerythritol diphosphite.

15. A molded article produced by a process including molding the resin composition of claim 13.

16. The method of claim 1, wherein 90 to 99 parts by weight of the polycarbonate or the polyarylate is mixed with 1 to 10 parts by weight of the polyester.

17. The method of claim 1, wherein the bisphenol component (B) comprises bisphenol A, and the dicarboxylic acid component (C) comprises sebacic acid.

18. The flowability improver of claim 7, wherein the bisphenol component (B) comprises bisphenol A, and the dicarboxylic acid component (C) comprises sebacic acid.

19. The flowability improver of claim 12, wherein the bisphenol component (B) comprises bisphenol A, and the dicarboxylic acid component (C) comprises sebacic acid.

* * * * *